US012347940B2

(12) United States Patent
Gupta et al.

(10) Patent No.: US 12,347,940 B2
(45) Date of Patent: Jul. 1, 2025

(54) INDEPENDENT CONTROL OF THE MAGNITUDE AND PHASE OF A REFLECTED ELECTROMAGNETIC WAVE THROUGH COUPLED RESONATORS

(71) Applicant: Carleton University, Ottawa (CA)

(72) Inventors: Shulabh Gupta, Ottawa (CA); Ahmed Zaki Ashoor, Ottawa (CA); Leandro Miguel Rufail, Ottawa (CA)

(73) Assignee: Carleton University, Ottawa (CA)

( * ) Notice: Subject to any disclaimer, the term of this patent is extended or adjusted under 35 U.S.C. 154(b) by 253 days.

(21) Appl. No.: 18/246,637

(22) PCT Filed: Sep. 24, 2021

(86) PCT No.: PCT/CA2021/051336

§ 371 (c)(1),
(2) Date: Mar. 24, 2023

(87) PCT Pub. No.: WO2022/061469

PCT Pub. Date: Mar. 31, 2022

(65) Prior Publication Data

US 2023/0352834 A1 Nov. 2, 2023

Related U.S. Application Data

(60) Provisional application No. 63/083,432, filed on Sep. 25, 2020.

(51) Int. Cl.

| | |
|---|---|
| ***H01Q 3/46*** | (2006.01) |
| ***H01Q 15/00*** | (2006.01) |
| ***H01Q 15/14*** | (2006.01) |

(52) U.S. Cl.

CPC ........... *H01Q 3/46* (2013.01); *H01Q 15/0086* (2013.01); *H01Q 15/148* (2013.01)

(58) Field of Classification Search

CPC ..... H01Q 15/0086; H01Q 15/148; H01Q 3/46
See application file for complete search history.

(56) References Cited

U.S. PATENT DOCUMENTS

| | | | | |
|---|---|---|---|---|
| 11,476,555 | B1 * | 10/2022 | Roper | G02F 1/19 |
| 12,206,174 | B2 * | 1/2025 | Pance | H01Q 21/0093 |

(Continued)

OTHER PUBLICATIONS

Tao et al., "Reconfigurable conversions of reflection, transmission, and polarization states using active metasurface," Appl. Phys. Lett., vol. 110, No. 12, 121901, 2017.

(Continued)

*Primary Examiner* — Thien M Le
(74) *Attorney, Agent, or Firm* — Brion Raffoul

(57) ABSTRACT

Systems and methods relating to independent control of a reflected EM (electromagnetic) wave's phase and magnitude. A reflective unit cell with independently controllable parameters allows for control of the magnitude and phase of the reflected wave. In some implementations, the unit cell uses coupled resonators, with each resonator having independently controllable parameters. The controllable parameters may be controllable/adjustable on the fly (dynamic parameters) or they may be configured and fixed (static parameters). The unit cell with dynamic parameters may use a dipole ring resonator nested with a split ring resonator. The unit cell with static parameters may use a rectangular ring resonator that is non-coplanar with but is electromagnetically coupled to a slot resonator. For both types of unit cell, the parameters of the resonators determine the magnitude and phase of the reflected wave.

18 Claims, 38 Drawing Sheets

(56) References Cited

U.S. PATENT DOCUMENTS

| | | | | |
|---|---|---|---|---|
| 2003/0142036 A1* | 7/2003 | Wilhelm | H01Q 1/38 343/756 |
| 2021/0359409 A1* | 11/2021 | Gómez-Diaz | H01Q 15/148 |
| 2022/0368159 A1* | 11/2022 | Mohammadabadi | B60L 53/51 |
| 2022/0407359 A1* | 12/2022 | Khromova | H01F 27/2804 |
| 2023/0106382 A1* | 4/2023 | Crouse | G02B 1/002 359/359 |
| 2023/0157058 A1* | 5/2023 | Mundoor | H10K 50/868 257/40 |
| 2024/0195073 A1* | 6/2024 | Yang | H01Q 13/106 |

OTHER PUBLICATIONS

Arbabi and Faraon, , "Fundamental limits of ultrathin metasurfaces," Sci. Rep., vol. 7, No. 1 p. 43722, 2017.
Cardin et al., "Surface-wave-assisted nonreciprocity in spatio-temporally modulated metasurfaces," Nat. Commun., vol. 11, No. 1, p. 1469, 2020.
Zhang et al., "Programmable coding metasurface for dual-band independent real-time beam control," IEEE J Emerging and Selected Topics in Circuits and Systems vol. 10, No. 1, p. 20, 2020.
Pitilakis et al., "A multi-functional intelligent metasurface : Electromagnetic design accounting for fabrication aspects," IEEE Transactions on Antennas and Propagation, vol. 69, No. 3, p. 1440, 2020.
Han et al "Millimeter-Wave Imaging Using 1-Bit Programmable Metasurface: Simulation Model, Design and Experiment," IEEE J. Emerg. Sel. Top. Circuits Syst., vol. 10, No. 1 pp. 1-10, 2020.
Jiang et al., "When metasurface meets hologram: principle and advances," Adv. Opt. Photonics, vol. 11, No. 3, p. 518, 2019.
Li et al., "Reconfigurable metasurface hologram by utilizing addressable dynamic pixels," Opt. Express, vol. 27, No. 15, p. 21153, 2019.
Li et al., "Electromagnetic reprogrammable coding-metasurface holograms," Nat. Commun., vol. 8, No. 1, pp. 1-7, 2017.
Bukhari et al., "A Metasurfaces Review: Definitions and Applications," Appl. Sci., vol. 9, No. 13, p. 2727, 2019.
Sung et al., "Review article Progresses in the practical metasurface for holography and lens," Nanophotonics vol. 9, No. 10, p. 1701, 2019.
Jing et al., "Full-space-manipulated multifunctional coding metasurface based on ' Fabry-Pérot-like ' cavity," Optics Express, vol. 27, No. 15, pp. 21520-21531, 2019.
Zhang, L., et al., "Breaking Reciprocity with Space-Time-Coding Digital Metasurfaces," Adv. Mater., vol. 1904069, p. 1904069, 2019.
Shao et al., "Dielectric 2-bit coding metasurface for electromagnetic wave manipulation," J. Appl. Phys., vol. 125, No. 20, p. 203101, 2019.
Chen et al., "Active Anisotropic Coding Metasurface with Independent Real-Time Reconfigurability for Dual Polarized Waves," vol. 1900930, pp. 1-9, 2019.
Lončar, et al., "Ultrathin active polarization-selective metasurface at X-band frequencies," Phys. Rev. B, vol. 100, No. 7, pp. 1-7, 2019.
Zhang, L. et al., Dynamically Realizing Arbitrary Multi-Bit Programmable Phases Using a 2-Bit Time-Domain Coding Metasurface, IEEE Trans. Antennas Propag., vol. 68, No. 4, p. 2984, 2020.
Xie et al., "High-Efficiency Ultrathin Dual-Wavelength Pancharatnam-Berry Metasurfaces with Complete Independent Phase Control," Adv. Opt. Mater., vol. 1900594, p. 1-9, 2019.
Fu et al., "Terahertz Beam Steering Technologies: From Phased Arrays to Field-Programmable Metasurfaces," Adv. Opt. Mater., vol. 1900628, p. 1900628, 2019.
Yu et al., "Low RCS Beam-steering Antenna Based on Reconfigurable Phase Gradient Metasurface," IEEE Antennas Wirel. Propag. Lett., vol. 18 PP, No. 10, p. 2016-2020, 2019.
Ramaccia et al., "Phase-Induced Frequency Conversion and Doppler Effect With Time-Modulated Metasurfaces," IEEE Trans. Antennas Propag., vol. 68, No. 3, pp. 1607-1617, 2019.
Wu and Grbic, "Serrodyne Frequency Translation Using Time-Modulated Metasurfaces," IEEE Trans. Antennas Propag., vol. 68, No. 3, pp. 1599-1606, 2019.
Sun et al., "Achieving Directive Radiation and Broadband Microwave Absorption by an Anisotropic Metasurface," IEEE Access, vol. 7, pp. 93919-93926, 2019.
Li et al., "Machine-learning reprogrammable metasurface imager," Nat. Commun., vol. 10, No. 1, p. 1082, 2019.
Guo et al., "Multi-functional coding metasurface for dual-band independent electromagnetic wave control," Opt. Express, vol. 27, No. 14, p. 19196, 2019.
He, "Tunable / Reconfigurable Metasurfaces : Physics and Applications," Research (Washington) 2019 (2019): 1849272-1849272. Web.
Quevedo-Teruel et al., "Roadmap on metasurfaces," J. Optcs, vol. 21, p. 073002 , 2019.
Wang and Caloz, "Spread-Spectrum Camouflaging based on Time-Modulated Metasurface," IEEE International Symposium on Antennas and Propagation and Usnc-Ursi Radio Science Meeting. vol. 2, pp. 1411-1412, 2019.
Direnzo et al., Smart Radio Environments Empowered by AI Reconfigurable Meta-Surfaces: An Idea Whose Time Has Come, arXiv.org 2019.
Li et al., "Intelligent metasurface imager and recognizer," Light Sci. Appl., vol. 8, No. 1, p. 97, 2019.
Kwon et al., "Transmission Magnitude and Phase Control for Polarization-Preserving Reflectionless Metasurfaces," Phys. Rev. Appl., vol. 9, No. 3, p. 34005, 2018.
Chen S. et al., "Phase Manipulation of ElectromagneticWaves with Metasurfaces and Its Applications in Nanophotonics," Adv. Opt. Mater., vol. 6, No. 13, 1800104, 2018.
Liu et al., "Programmable Metasurfaces: State of the Art and Prospects," Proc.—IEEE Int. Symp. Circuits Syst., vol. 2018—May, pp. 1-5, 2018.
Liaskos et al., "A New Wireless Communication Paradigm through Software-Controlled Metasurfaces," IEEE Commun. Mag., vol. 56, No. 9, pp. 162-169, 2018.
Hsiao et al., "Fundamentals and Applications of Metasurfaces," Small Methods, vol. 1, No. 4, p. 1600064, 2017.
Zhang Q et al., "Shaping electromagnetic waves using software-automatically-designed metasurfaces," Sci. Rep., vol. 7, No. 1, p. 3588, 2017.
Huang, et al., , "Reconfigurable Metasurface for Multifunctional Control of Electromagnetic Waves," Adv. Opt. Mater., vol. 5, No. 22, 1700485, 2017.
Feng Y et al "Active metasurfaces for dynamic electromagnetic wave control," 2016 Progress in Electromagnetic Research Symposium (PIERS), 2016, pp. 1568-1568, doi: 10.1109/PIERS.2016.7734712.
Smy TJ and Gupta S "Electromagnetic Illusions created using Metasurface Holograms with Finite-Sized Unit Cells," 2020 IEEE International Symposium on Antennas and Propagation and North American Radio Science Meeting, 2020, pp. 921-922, doi: 10.1109/IEEECONF35879.2020.9329861.
International Search Report and Written Opinion for PCT/CA2021/051336, dated Dec. 8, 2021.
Feng, Yijun, et al. "Active metasurfaces for dynamic electromagnetic wave control", 2016 Progress in Electromagnetic Research Symposium (PIERS), 2016, pp. 1568-1568, doi: 10.1109/PIERS.2016.7734712.
Smy, T.J. et al. "Electromagnetic Illusions created using Metasurface Holograms with Finite-Sized Unit Cells", 2020 IEEE International Symposium on Antennas and Propagation and North American Radio Science Meeting, 2020, pp. 921-922, doi:10.1109/IEEECONF35879.2020.9329861.

* cited by examiner (Perspective View)

(Top View)

(OVERLAY VIEW)

INDEPENDENT CONTROL OF THE MAGNITUDE AND PHASE OF A REFLECTED ELECTROMAGNETIC WAVE THROUGH COUPLED RESONATORS

CROSS REFERENCE TO RELATED APPLICATIONS

This application is a 35 U.S.C. 371 national stage filing and claims priority to International Application No. PCT/CA2021/051336 filed on Sep. 24, 2021, entitled "INDEPENDENT CONTROL OF THE MAGNITUDE AND PHASE OF A REFLECTED ELECTROMAGNETIC WAVE THROUGH COUPLED RESONATORS", which claims the benefit of U.S. Provisional Application No. 63/083,432, filed on Sep. 25, 2020, each of which are incorporated herein by reference in their entirety.

TECHNICAL FIELD

The present invention related to reflected electromagnetic waves. More specifically, the present invention relates to systems and methods that allow for independent control of a reflected EM wave's magnitude and phase.

BACKGROUND

Electromagnetic (EM) metasurfaces are 2D array sub-wavelength resonators that have recently emerged as a powerful platform for a variety of wave transformations including magnitude and phase control in reflection and transmission, in addition to the polarization manipulation. A wide range of applications have been reported to control the reflected EM wave magnitude and phase such as anomalous reflections, EM wave absorbers, high impedance surfaces and artificial magnetic conductors, and beam-forming and beam scanning antennas, to name a few. A recent trend in metasurface-based electromagnetic wave control is to add general space-time modulation of their constitutive parameters for exotic applications such as artificial non-reciprocity and harmonic generation.

For complete control over the scattered fields at a desired operating frequency, metasurface unit cells based on sub-wavelength resonators are preferably capable of providing a full range of amplitude and phase in the desired mode of operation—transmission or reflection—for each orthogonal polarization.

While several works have discussed independent control of phase and magnitude, the majority of these works have been restricted to passive metasurfaces. The techniques used in these works typically employ polarization rotation where the unit cell is physically rotated to introduce amplitude modulation of the desired polarization component while the varying unit cell dimensions are designed for phase control. Unfortunately, this approach introduces spurious cross-polarized components that may require separate processing to avoid undesired interference with the environment. In addition, in various practical scenarios, real-time control of wave transformation through metasurfaces is highly desirable. As an example, this is highly desirable when such surfaces are used in wireless applications where the channel characteristics are typically time-varying due to moving objects and people. In such applications, the metasurface acts as a smart reflector that can adaptively guide and manipulate the EM waves as the environment dynamically changes. It would therefore be desirable for such metasurfaces to be real-time reconfigurable.

In addition to the above, while real-time reconfigurable metasurfaces are desirable, such systems may be too complex and cumbersome for some applications. Such applications may only require a fixed reflection of an incoming electromagnetic wave. Accordingly, simpler, fixed configuration metasurfaces are also desirable.

SUMMARY

The present invention provides systems and methods relating to independent control of a reflected EM wave's phase and magnitude. A reflective unit cell with independently controllable parameters allows for control of the magnitude and phase of the reflected wave. In some implementations, the unit cell uses coupled resonators, with each resonator having independently controllable parameters. The controllable parameters may be controllable/adjustable on the fly (dynamic parameters) or they may be configured and fixed (static parameters). The unit cell with dynamic parameters may use a dipole ring resonator nested with a split ring resonator. The unit cell with static parameters may use a rectangular ring resonator that is non-coplanar with but is electromagnetically coupled to a slot resonator. For both types of unit cell, the parameters of the resonators determine the magnitude and phase of the reflected wave.

In a first aspect, the present invention provides a system for reflecting at least one incoming electromagnetic wave, the system comprising:

- an array of unit cells for reflecting said at least one incoming electromagnetic wave to thereby redirect said at least one incoming electromagnetic wave;

wherein each unit cell of said array of unit cells redirects said at least one incoming electromagnetic wave such that characteristics of said electromagnetic waves that have been redirected by said array are determined by a configuration of said each unit cell.

In another aspect, the present invention provides a system for reflecting at least one incoming electromagnetic wave, the system comprising:

- an array of unit cells for reflecting said at least one incoming electromagnetic wave to thereby redirect said at least one incoming electromagnetic wave;
- a controller for controlling parameters of said array of unit cells, said parameters of said array of unit cells being determinative of parameters for electromagnetic waves that have been redirected by said array;

wherein each unit cell of said array of unit cells redirects said at least one incoming electromagnetic wave and each unit cell has independently controllable parameters such that said independently controllable parameters determine a reflection magnitude and a reflection phase of said electromagnetic waves that have been redirected by said unit cell; wherein said independently controllable parameters for each unit cell are controlled by said controller.

It should be noted that the independently controllable parameters may comprise an independently controllable resistance and an independently controllable capacitance. As well, at least one unit cell of said array of unit cells may comprise at least one pair of coupled resonators, each of the resonators in the at least one pair of coupled resonators having an independently controllable parameter. Also, each pair of coupled resonators may comprise a dipole ring resonator and a split ring resonator.

For the above embodiment, the dipole ring resonator has a tunable lumped resistive element such that a resistance of said dipole ring resonator is controllable by controlling the tunable lumped resistive element. The tunable lumped resistive element may be a PIN diode. In addition, the split ring resonator may have a tunable lumped capacitor. This tunable lumped capacitor may be a varactor diode.

In another embodiment, the dipole ring resonator and the split ring resonator may be interleaved with one another. Alternatively, the dipole ring resonator and the split ring resonator may be nested with one another. In another implementation, the parameters of the array of unit cells may be adjusted in near real time by the controller. This adjustment may be implemented such that the parameters of the array of unit cells are independently adjusted in near real time by the controller by adjusting parameters for each unit cell in the array. For clarity, the parameters may comprise at least one of: a capacitance and a resistance for each unit cell in the array.

In yet another embodiment, the controller adaptively controls the parameters based on a desired reflection result, with the parameters for the array of unit cells being based on sensed parameters of the incoming electromagnetic wave.

In a further aspect, the present invention provides a unit cell for use in reflecting at least one incoming electromagnetic wave, the unit cell comprising:

a rectangular ring resonator having a fixed length, width, and thickness;

a slot resonator having a fixed slot length and slot width;

wherein parameters of said rectangular ring resonator and parameters of said slot resonator are configured to produce a specific reflecting magnitude and phase for at least one reflected electromagnetic wave;

wherein said rectangular ring resonator is on a first plane and said slot resonator is on a second plane, said first plane being parallel to said second plane;

wherein said first plane is spaced apart from said second plane.

In another aspect, the present invention provides a unit cell for use in reflecting at least one incoming electromagnetic wave, the unit cell comprising:

a dipole ring resonator having a tunable lumped resistive element;

a split ring resonator having a tunable lumped capacitor;

wherein a resistance of said resistive element and a capacitance of said capacitor is each tunable independently of one another;

wherein said dipole ring resonator and said split ring resonator are interleaved with one another.

BRIEF DESCRIPTION OF THE DRAWINGS

The embodiments of the present invention will now be described by reference to the following figures, in which identical reference numerals in different figures indicate identical elements and in which.

DETAILED DESCRIPTION

In one aspect, the present invention includes a metasurface unit cell architecture that allows independent control of the field magnitude and phase, in reflection and in real-time, without generating any cross-polarized scattered fields. In one implementation, the metasurface is based on a coupled resonator configuration where each resonator is separately tuned using a varactor (variable capacitor) and a PIN diode (a forward biased diode for variable resistance where an undoped semiconductor or intrinsic region is sandwiched between a P and an N region to result in a P-I-N diode) for reflection phase and reflection magnitude control, respectively.

For clarity, the term "amplitude" is to mean specific amplitude values for electromagnetic waves while the term "magnitude" is to mean the effect of a metasurface or of a unit cell on a reflected electromagnetic wave's amplitude. Thus, if an incident wave is represented by Acos θ, then the amplitude of that incident wave is A. If the incident wave is reflected by a metasurface to result in a reflected wave of yA cos(θ+α), then the reflection magnitude is y and the amplitude of that reflected wave is yA.

In one aspect of the present invention, there is provided a novel metasurface unit cell architecture that enables independent control of reflection magnitude and phase at a desired operation frequency while simultaneously maintaining linear polarization of the incoming fields. In one implementation, the structure is based on a coupled resonator configuration where a Dipole Ring Resonator (DRR) and a Split Ring Resonator (SRR) are interleaved. In such a configuration, the DRR is loaded with a tunable lumped resistive element (e.g., PIN diode) while the SRR is loaded with a lumped tunable capacitor (e.g., varactor diode). The resulting surface is operated around one of the coupled resonant frequencies and an independent tuning of the lumped capacitance and resistance elements of the system enable a wide coverage of amplitude-phase of the reflected electromagnetic wave. This wide coverage is significantly larger than what would have been achievable using a single resonator configuration.

Figure 1:
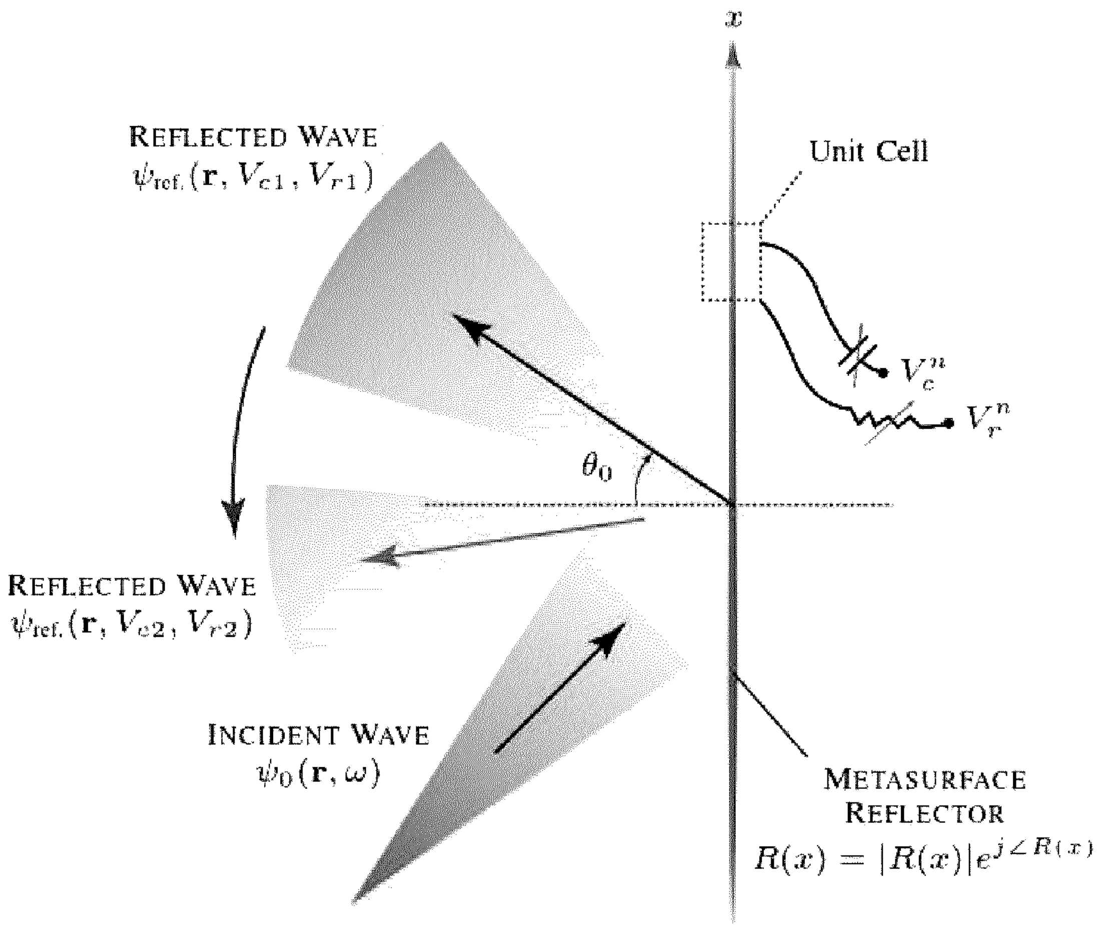
FIG. 1 is a schematic diagram of a reconfigurable metasurface reflector illustrating the incoming and reflected waves.

To explain the various aspects of the present invention, consider a reflection metasurface which is excited with an incident wave $\Psi_0(r, \omega)$, as illustrated in FIG. 1. The metasurface is composed of an array of identical unit cells, with each unit cell being individually controlled with a tunable capacitor and a resistor with separate external voltage controls ($V_c$, $V_r$). The tunable lumped elements integrated into the unit cell controls the spatially varying complex reflectance, $\Gamma(x)=|\Gamma(x)|e^{j\angle\Gamma(x)}$, of the metasurface across the surface. By varying the voltage controls, the desire is to reconfigure the reflected scattered fields, and in doing so, produce a unit cell that is capable of providing a full range of a reflected wave's amplitude $|\Gamma(f_0)|\in[0,1]$ and phase $\angle\Gamma(f_0)\in[0, 2\pi]$ independently at a desired frequency of operation. FIG. 1 shows a reconfigurable metasurface reflector that transforms incoming incident fields into desired scattered fields via active unit cells. In one implementation, the unit cells use varactor diodes and PIN diodes for an independent phase and amplitude control of a reflected wave.

To illustrate the desirability of controlling reflection magnitude and phase, consider that the metasurface is excited with a normally incident uniform plane-wave. The reflected scattered fields in the far-field of the surface due to spatially varying complex reflectance of the surface can be constructed using standard array factor of antenna theory (linear polarization with no rotation is assumed). More specifically, considering the metasurface as an N-element linear array (considered here for the sake of simplicity, but easily extended to a 2D array of arbitrary arrangement) of unit cell size d, the overall reflection pattern of the surface (considering the surface as a distribution of point sources) may simply be modeled as $$AF = \sum_{n=1}^{N} a_n e^{j(n-1)(kd\cos\theta+\beta)} \tag{1}$$

where $a_n$ are the complex excitation coefficients for each element, β is the progression phase between the array's elements (which is zero for normally incident plane-wave, assumed here), k is the wavenumber, θ is the angle between the axis of the array along the x-axis and the radial vector from the origin to the observation point.

Figure 2A:
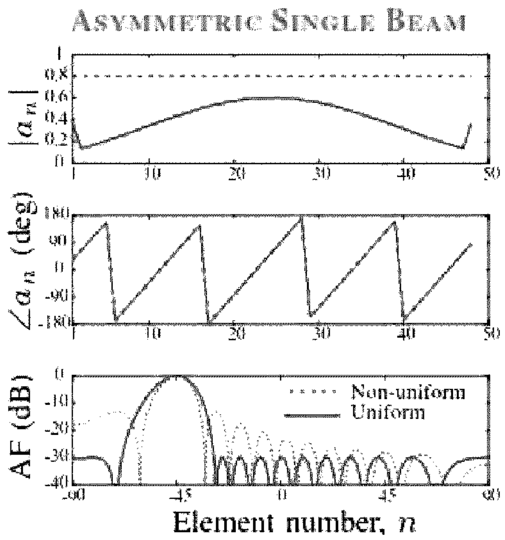
FIGS. 2A and 2B illustrate the array factors of a uniform spaced linear array with uniform and non-uniform amplitude distributions and a specific phase progression.
Figure 2B:
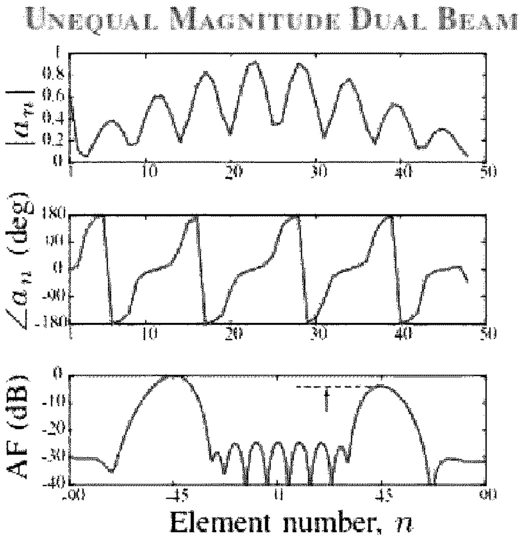

To continue in the analysis, one can take an example of a beam-steered metasurface which reflects the incident beam at an angle of $\theta_0$. As well-known from both antenna theory and metasurface analysis, a linear phase gradient across the metasurface will provide such a beam-tilt in the far-field. FIG. 2A shows an example where the beam is reflected off $\theta_0=-45$ using a metasurface of finite size, where a linear phase tilt and a uniform magnitude profile is imposed across the surface. As expected from a uniform magnitude surface, the main radiation beam is accompanied by side-lobes with peak-values at −13 dB, typical of uniform apertures. If, instead, a spatially varying non-uniform magnitude profile is also imposed in addition to the phase, the side-lobes in the reflection field can be engineered and greatly reduced, as shown in FIG. 2A maintained at, for example, −30 dB. Another case that exemplifies the usefulness of simultaneous magnitude and phase control arises when designing two asymmetrically located beams. This example is shown in FIG. 2B, where the incident wave is split into two beams, with the beams being of unequal magnitudes. It is clear that such a reflection pattern cannot be achieved using only either phase control or magnitude control.

In the Figures, FIGS. 2A and 2B are illustrations detailing the importance of controlling an array's element magnitudes showing the Array Factors (AFs) of a uniform spaced linear array with uniform and non-uniform amplitude distributions with a specific phase progression. FIG. 2A shows the non-uniform and uniform AFs for a single tilted beam at an angle of 45° while FIG. 2B shows a multi-beam array tilted at angles of +/−45° with a different reflection gain for each beam.

Figure 3A:
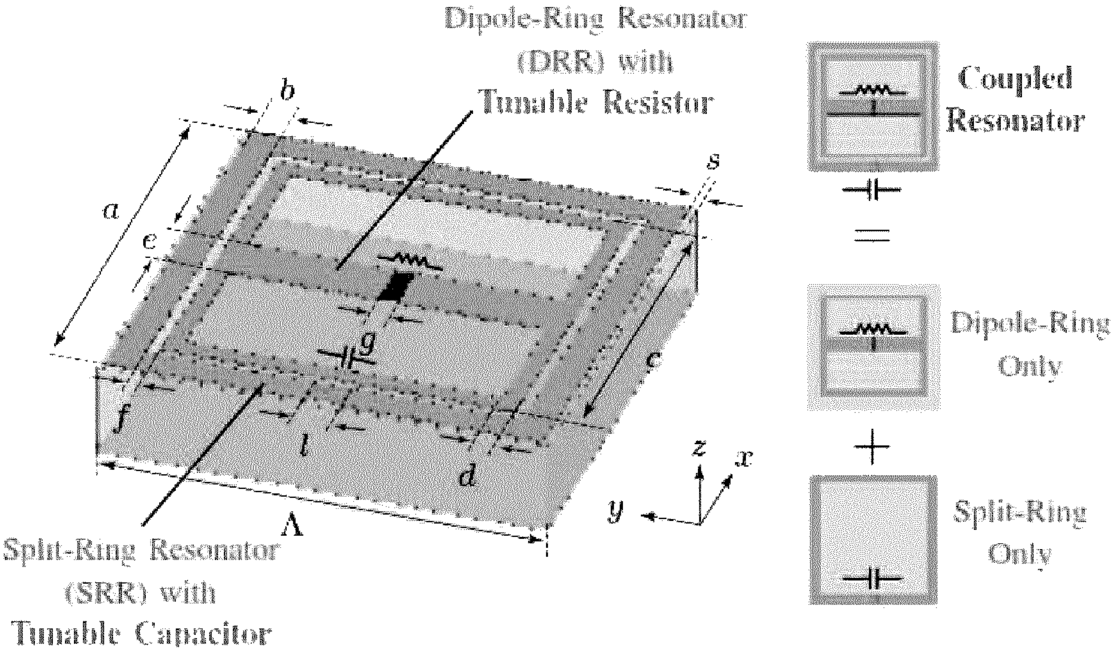
FIG. 3A shows a unit cell according to one aspect of the present invention.

A conventional reflection unit cell providing real-time phase control consists of a lumped tuning element, typically a varactor diode that is integrated inside a sub-wavelength resonator. Two simple geometries that are commonly used are Split Ring Resonator (SRR) and Dipole Ring Resonator (DRR), as shown in FIG. 3A. Since their resonance frequency is tuned via lumped capacitance, the reflection phase at a desired fixed frequency is changed along with an uncontrolled magnitude variation due to dissipation losses of the materials. For a controlled magnitude variation, a second dissipative element must be added that controls the resonator losses. These losses ideally operate independently of the capacitance value.

FIG. 3A shows a unit cell formed as a combination of an SRR and DRR. The unit cell incorporates these two lumped elements that allow for independent magnitude and phase control. The architecture specifically consists of an SRR loaded with a varactor acting as a tunable capacitor which dominantly controls its resonant frequency. A DRR, loaded with a PIN diode, is inserted inside the SRR and acts as a tunable resistor which controls the reflection magnitude of the cell. Since the two resonators are strongly coupled, the unit cell is operated at one of its coupled resonances, so that its reflection magnitude and phase are controlled by the two lumped tuning elements together. In all cases, the unit cell period is $\Lambda \ll \lambda_0$ to maintain sub-wavelength characteristics for good spatial discretization of magnitude and phase when configured to form a non-uniform metasurface. It can be seen from FIG. 3A that, for the unit cell, the DRR is nested inside or within the SRR. The SRR has a tunable capacitor and encircles the DRR. The DRR has a tunable resistor and nests within the SRR to result in a unit cell that has a number of coupled resonances.

It should be clear that, while this document refers to nested resonator structures, other resonator structures may be used. Any structure that incorporates multiple (i.e., two or more) resonators that are electromagnetically coupled with one another, where one or more resonators controls the phase of a reflected wave and one or more resonators controls the amplitude of a reflected wave (by controlling the reflected wave's magnitude), may be used. The nested configuration of the resonators enables stronger electrical coupling between the resonators and, for some implementations, tight coupling between the resonators is preferred. Other configurations, such as placing resonators adjacent to or in close proximity to one another, may also be used as long as the configuration allows for coupling between the resonators. It should also be clear that, while the implementation of the unit cell detailed in this document has a rectilinear shape, other shapes may be possible. Referring to FIG. 3D, a circular embodiment of the nested resonators is illustrated. The rectilinear shaped unit cell in FIG. 3A is preferably for use with linearly polarized waves and exhibits spatial symmetry along one axis. The circularly shaped unit cell of FIG. 3D is rotationally symmetric and now enables a polarization tolerant reflection surface. The circular unit cell can also be adapted to handle circularly polarized waves that feature near identical responses to arbitrary polarization of incoming waves. It should be clear that the unit cell illustrated in FIG. 3D has nested DRR and SRR resonators.

Figure 3B:
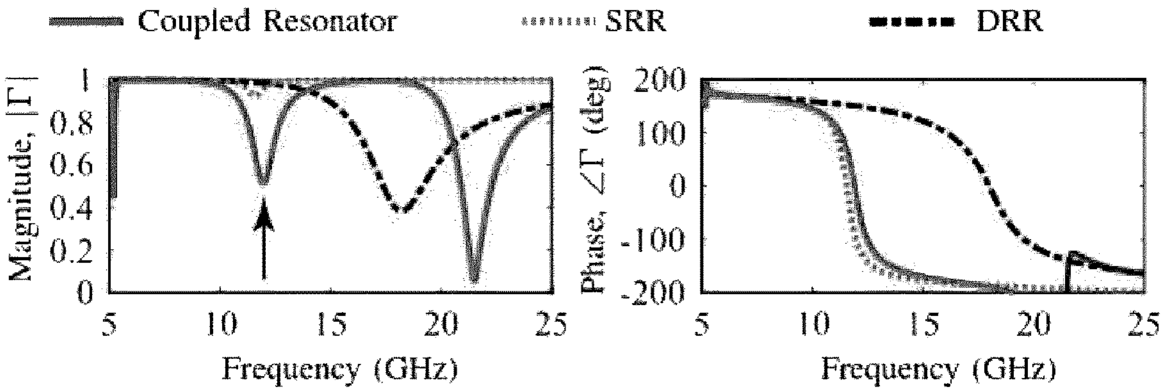
FIG. 3B shows typical phase and magnitude response of the unit cell illustrated in FIG. 3A.

A typical unit cell response of the unit cell is shown in FIG. 3B, along with the response of an isolated SRR structure (loaded with capacitance C) and an isolated DRR structure (loaded with resistance R). Owing to the larger resonant length, the SRR features a lower resonant frequency (dashed blue curve) compared to that of DRR (dashed black curve) when working in isolation, and thus have different frequency of resonances. When they are superimposed, they are strongly coupled electromagnetically, and the resonant frequencies of the combined unit cell are strongly perturbed, as seen in FIG. 3B.

Figure 3C:
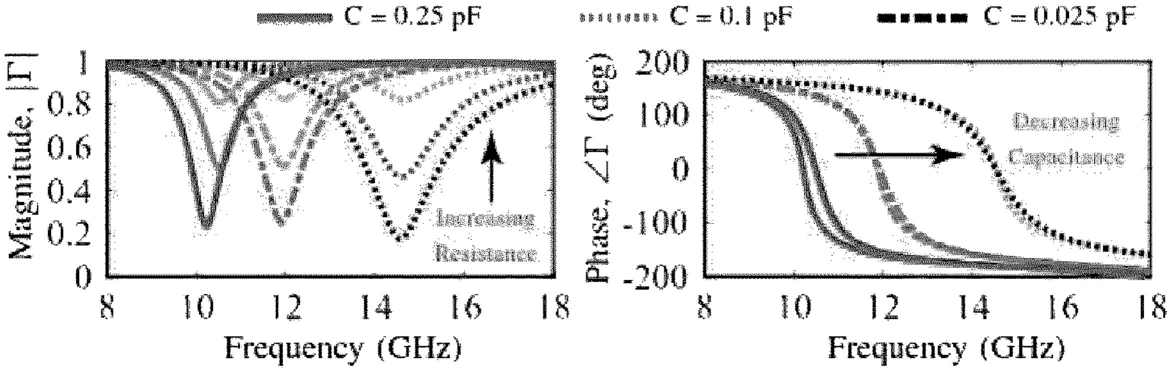
FIG. 3C shows the phase and magnitude response of unit cell with different parameters.
Figure 3D:
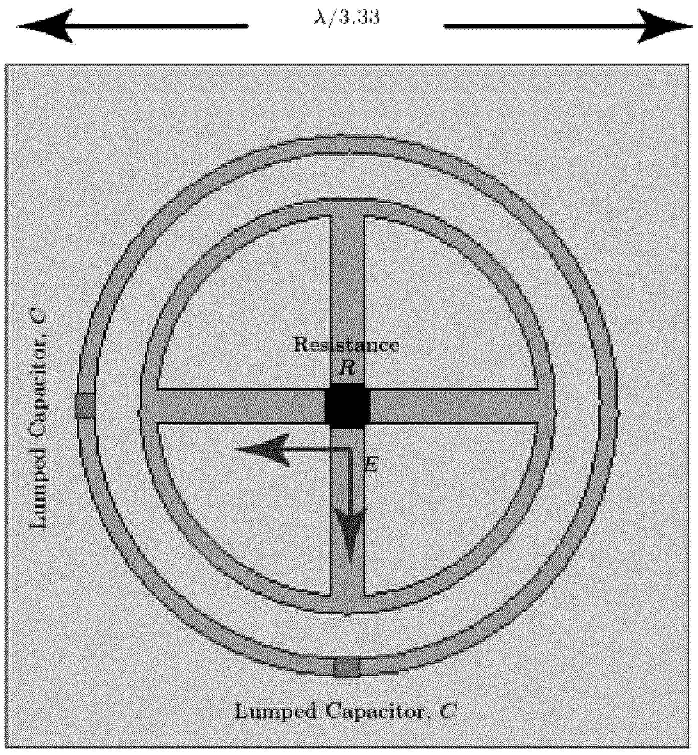
FIG. 3D illustrates a circular unit cell using nested DRR and SRR resonators.

The unit cell can be operated at one of these resonant frequencies, with the knowledge that the resonant frequency $f_0$ and the Q-factor depend on both the capacitance and the resistance values. This is illustrated in FIG. 3C using one of the resonant peaks of the coupled system. For a fixed capacitance value C, when the resistance of the DRR is changed, the Q-factor ($=f_0/\Delta f$) changes with minimal effect on $f_0$. Larger R values are seen to correspond to lower reflection from the surface, while maintaining the resonance frequency and, thus, the reflection phase. As the capacitance is decreased, the resonant frequency $f_0$ is increased as expected, while nearly maintaining its reflection magnitude level. Thus, the C and R values represent two independent controls on the reflection phase and on the reflection magnitude with minimal interdependence.

It should be clear that the reflective surface can consist of an arbitrary number of resonator structures (i.e., unit cells) forming an array. These resonator structures are distributed over the surface in any variety of a lattice pattern (including but not limited to rectangular, hexagonal, etc.). The unit cell periodicities are sub-wavelength, although larger unit cell periods may be utilized in some cases (typical ranges from $\lambda/10$ to just about $\lambda$, where $\lambda$ is the wavelength in free space at the desired operating frequency). It should be clear that there is no limit on the number of cells and array sizes as these are governed by practical considerations based on proportional cost and complexity. As well, there is no limit as to the array shape and/or form—the array may be rectilinear, circular, or hexagonal in shape or the array may have any shape necessary to achieve the desired reflected wave parameters. Similarly, the array may have a 2D or a 3D configuration.

In addition to the above, the electronic control circuitry for controlling the parameters of the resonator structures operates at DC and scales with the size of the array. While commercial off-the-shelf discrete lumped components (such as varactors and PIN diodes for resistance control) are typically limited to lower microwave frequencies, these can be built to operate up to at least 100 GHz. Depending on the fabrication process, the reflective surface can be scaled up to operate in the terahertz (THz) range. Beyond the terahertz range, materials must be engineered to provide the desired tunable capacitances and resistances. The resistance and capacitance ranges for the unit cell may vary from application to application. These resistance and capacitance ranges mainly affect the frequency of operation and different parameter ranges may be made to work for a specific desired frequency or frequency range by engineering the geometrical and electrical properties of the unit cell.

As can be seen, FIG. 3A shows a unit cell architecture based on a Split Ring Resonator (SRR) coupled with a Dipole Ring Resonator (DRR). The SRR is loaded with a tunable capacitor while the DRR is loaded with a tunable resistor. FIG. 3B shows FEM (finite element method)-Simulated magnitude and phase responses of three configurations ($R=25\Omega$ and $C=0.1$ pF). FIG. 3C shows simulated magnitude and phase of the coupled resonator unit cell with three different resistances ($R=5, 25, 50\Omega$) and three different capacitances ($C=0.025, 0.1, 0.25$ pF). All simulations were performed in FEM-HFSS (Finite Element Method-High Frequency Structure Simulator).

Figure 3E:
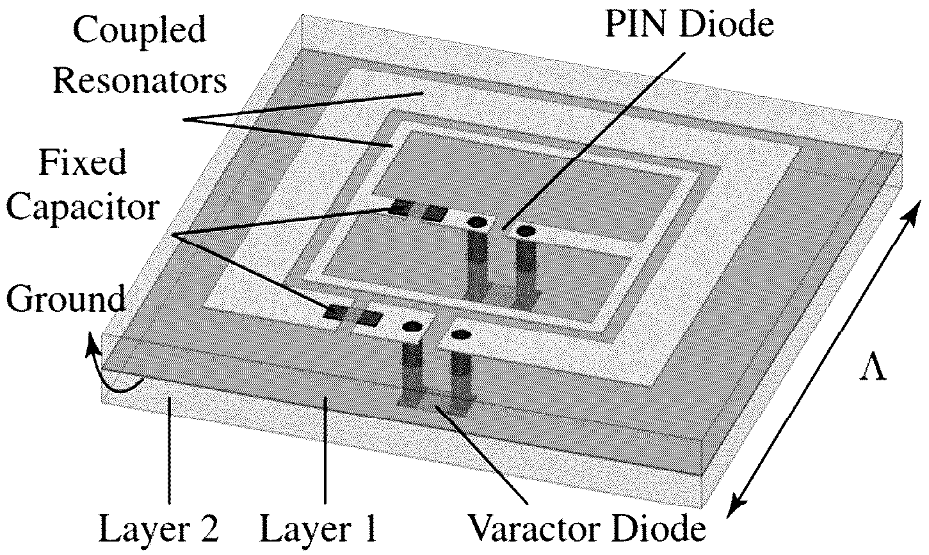
FIG. 3E shows a perspective view of an implementation of a unit cell according to one aspect of the present invention.
Figure 3F:
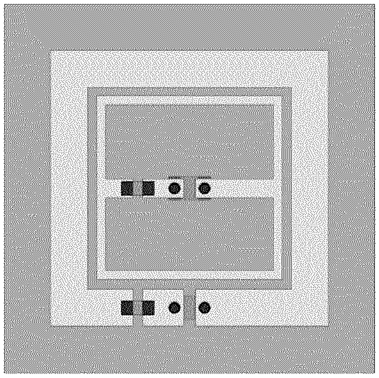
FIG. 3F shows a top view of the implementation illustrated in FIG. 3E.
Figure 3G:
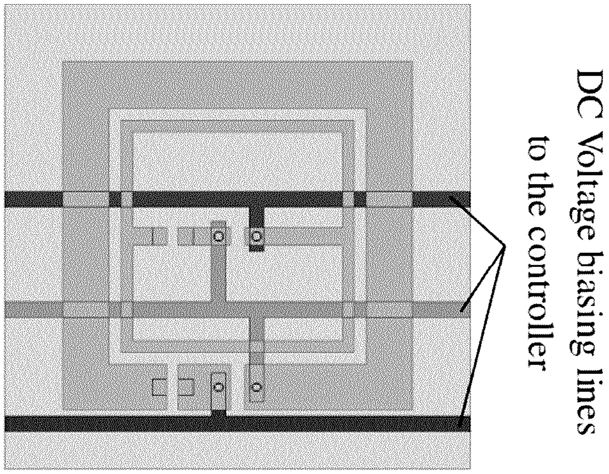
FIG. 3G shows an overlay view of the implementation illustrated in FIG. 3E.

Referring to FIGS. 3E to 3G, illustrated are different views of an implementation of a unit cell according to one aspect of the present invention. In FIG. 3E, it can be seen that the implementation uses nested DRR and SRR resonators as detailed in FIG. 3A. The various components of the unit cell are detailed in FIG. 3E. The DC biasing lines used to bias the unit cell can be seen in the overlay view in FIG. 3G. The implementation illustrated in FIGS. 3E to 3G was designed for 10 GHz (gigahertz).

Regarding the various physical dimensions detailed in FIG. 3A, the values used for one implementation are as detailed in Table A attached at the end of this document. Also provided in Table A are a number of parameters detailing an implementation of a metasurface array according to another aspect of the present invention.

Regarding the lumped elements used in the various aspects of the present invention, the parameters for these elements, for some implementations, are detailed in Table B.

Figure 4A:
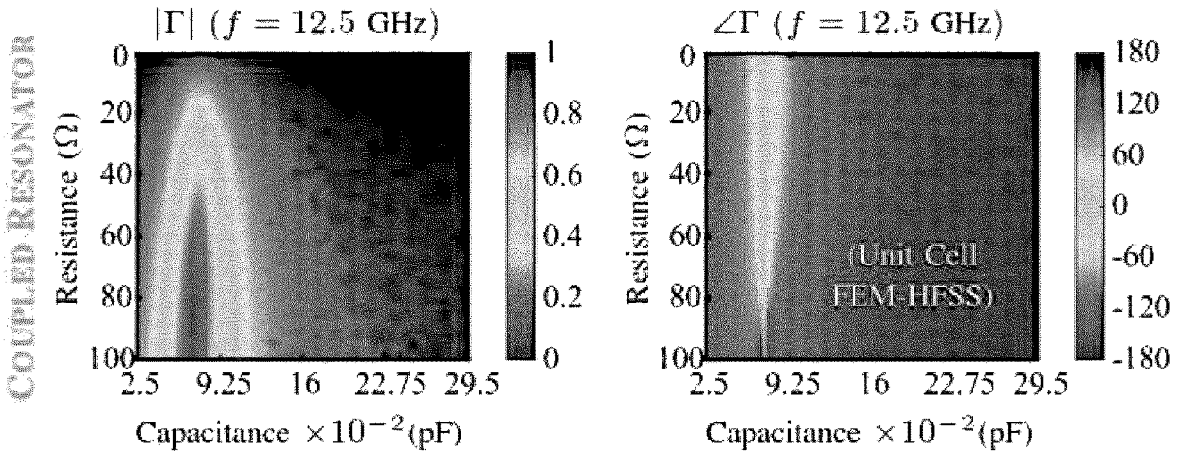
FIGS. 4A and 4B show the simulated amplitude-phase distribution at a fixed frequency as a function of lumped element values for different unit cells.

In practical cases, the operation frequency $f_0$ is typically fixed and it would be preferable to obtain a map of the achievable amplitude-phase map for a given unit cell configuration at a given operational frequency. FIG. 4A shows a 2D map of the reflection magnitude and phase for varying R and C values at a fixed $f_0$. The reflection phase shows only a slight variation as the resistance value is changed for a fixed capacitance, while large variation is seen in the magnitude response. On the other hand, the reflection phase is gradually decreased as capacitance increases, except near the regions where the surface is fully absorptive, i.e. $|\Gamma|\approx 0$. If a specific reflection amplitude-phase pair $\{|\Gamma|, \angle\Gamma\}$ is sought, the phase is first fixed to $\angle\Gamma$ by choosing an appropriate capacitance $C_0$, followed by resistance $R_0$ tuning to achieve the desired reflection magnitude of $|\Gamma|$.

Figure 4B:
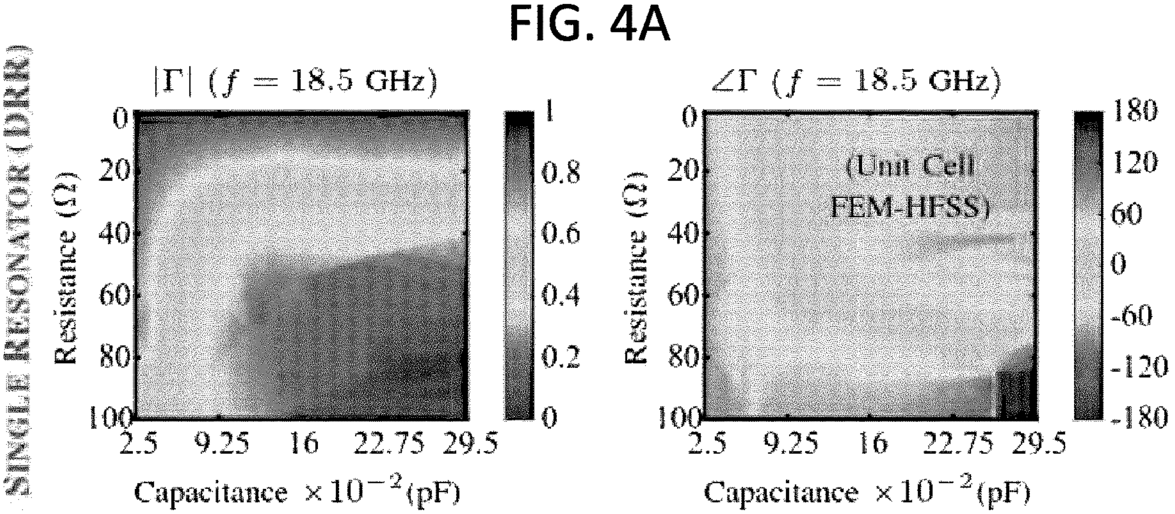

In FIG. 4, illustrated are FEM-HFSS simulated amplitude-phase distribution at a fixed frequency as a function of lumped element values. FIG. 4A shows the distribution for a coupled resonator unit cell according to one aspect of the current invention while FIG. 4B shows the distribution for a Dipole Ring Resonator unit cell where the resistance and capacitance are configured in series in the DRR gap.

Figure 5A:
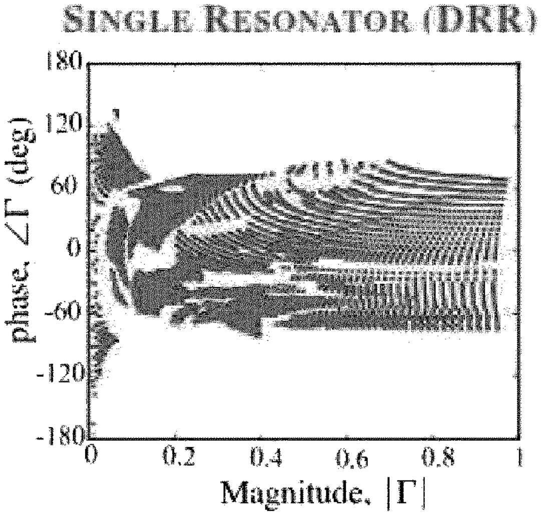
FIGS. 5A and 5B show amplitude-phase coverage plots for a single resonator and for a coupled resonator according to one aspect of the present invention.
Figure 5B:
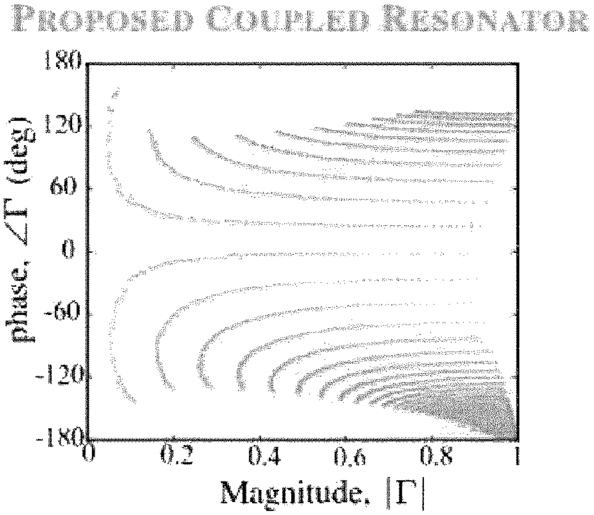

At this point, one may wonder if a single SRR or DRR resonator with both R and C elements may also provide independent amplitude and phase control? To investigate this, FIG. 5B shows the 2D reflection amplitude and phase maps for a DRR unit cell where a series R-C has been integrated in the gap. In this case, large phase tuning is observed at a higher frequency for the same lumped element ranges as that of FIG. 4A (i.e., 18.5 GHz vs 12.5 GHz, around the isolated resonance of the DRR). No clear independent control is visible, although some combinations of R-C may be found which can provide the desired $\{|\Gamma|, \angle\Gamma\}$ combinations. This amplitude-phase coverage range may be seen more clearly in FIG. 5 where each pixel represents amplitude-phase combinations that achievable using a certain $\{R, C\}$ combination. While a single resonator configuration shows a dense distribution with a large variation in reflection magnitudes, the phase range is restricted and there is a lack of a clear mapping between $\{R, C\}$ and $\{|\Gamma|, \angle\Gamma\}$. On the other hand, the unit cell according to one aspect of the invention features a well-defined distribution with significantly larger coverage across both phase and magnitude (see FIG. 5B).

In FIG. 5, illustrated are amplitude-phase coverage plots for the unit cells of FIG. 4 showing achievable values using the capacitance values ranging between 0.025-0.295 pF and resistance values ranging between 1–100Ω. FIG. 5A shows the amplitude-phase coverage plot for a single dipole-ring resonator where the resistance and capacitance are configured in series in the DRR gap. FIG. 5B shows the coverage plot for the coupled resonator according to one aspect of the present invention.

It should be noted that, even though some level of amplitude-phase control is possible using a single resonator based unit cell, this is not particularly suited for practical implementations. Both the varactor and the PIN diodes as practical means of controlling capacitance and resistance require separate voltage control lines for reverse-biasing and forward-biasing, respectively, and this is not convenient in a single resonator configuration. On the other hand, for the coupled resonator cells according to one aspect of the present invention, the two lumped elements are physically disconnected and are located on different resonators. Thus, the lumped elements can be individually biased using standard biasing networks with ease. The coupled resonator architecture according to one aspect of the present invention therefore more practical than a single resonator based architecture.

A better understanding of the metasurface structure according to one aspect of the present invention may be gained using an equivalent circuit model representation. Since the metasurface's unit cell consists of two coupled resonators, namely a DRR and an SRR, a circuit model can be developed for each resonator individually with its respective tuning element. The overall response of the metasurface's unit cell can then be constructed by combining the developed equivalent circuit models of the two resonators while considering the electromagnetic coupling effects.

Single Resonator (Dipole/Split-Ring)

Figure 6A:
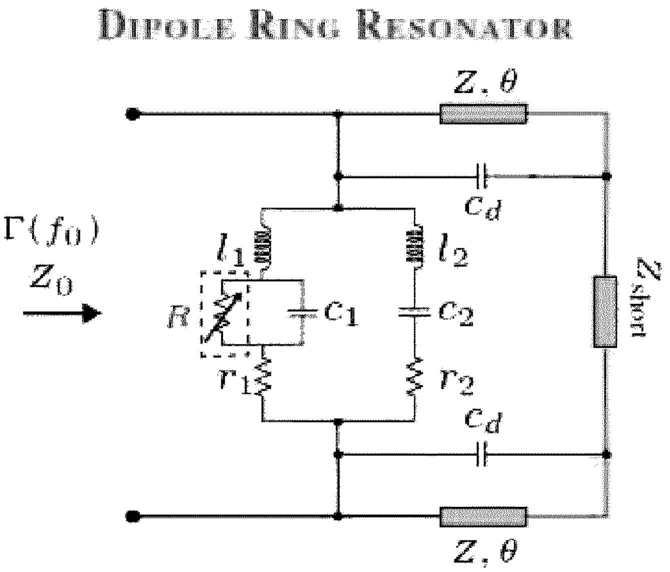
FIGS. 6A and 6B are schematic diagrams of equivalent circuit models for the resonators used in one aspect of the invention.

The two resonators in the metasurface's unit cell (i.e., the DRR and SRR resonators) can be modeled using a circuit model representation approach. The equivalent circuit models are based on an equivalent transmission lines representation of the metasurface's unit cell resonators. The DRR is modeled with a two-shunt combination of series RLC when a normally incident free space plane-wave with a characteristic impedance of $Z_0$ excites the DRR with an E-field being polarized along y-axis as shown in FIG. 6A. When the DRR's exciting gap is loaded with an active element such as a PIN diode to control the overall impedance of the DRR, a loaded resistance R representing the overall impedance of the active element is modeled in shunt across the DRR's gap $c_1$. The coupling between the adjacent cells is represented by $c_2$.

Figure 6B:
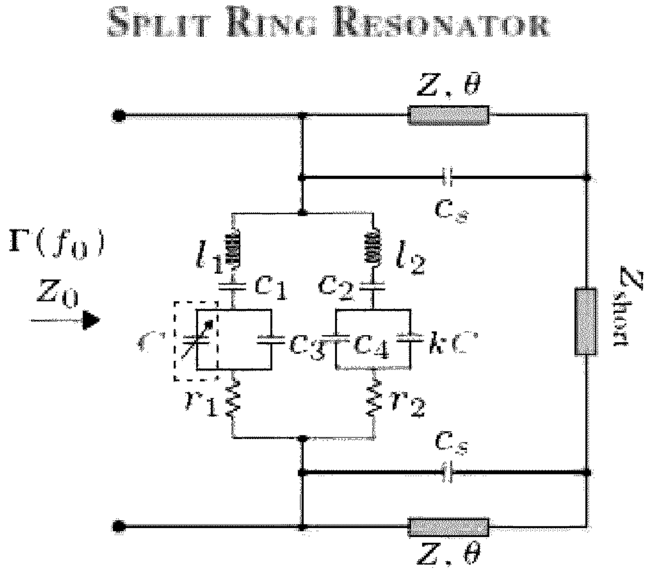

The SRR equivalent circuit is modeled similarly with a two-shunt combination of series RLC as shown in FIG. 6B with some modifications that account for the off-balanced normally incident E-field along the y-axis. An off-balanced E-field is seen by the two SRR arms and between the adjacent cells when its gap $c_3$ is loaded with an active element, such as a varactor C, with $c_1$, and $c_2$ representing the coupling between the adjacent cells on each SRR arm. Shunt capacitances of $c_4$ and k(C) are modeled to account for cell asymmetry and to account for the changes on the inter-element coupling capacitance due to the changes on the active loaded capacitance C. Finally, the grounded dielectric substrate on both the DRR and SRR resonators is modeled as a shorted transmission line with a characteristic impedance of Z with shunt capacitance $c_d$ and $c_s$, respectively, being used to account for the small electromagnetic coupling between the resonators and their grounded dielectric substrates.

Figure 6C:
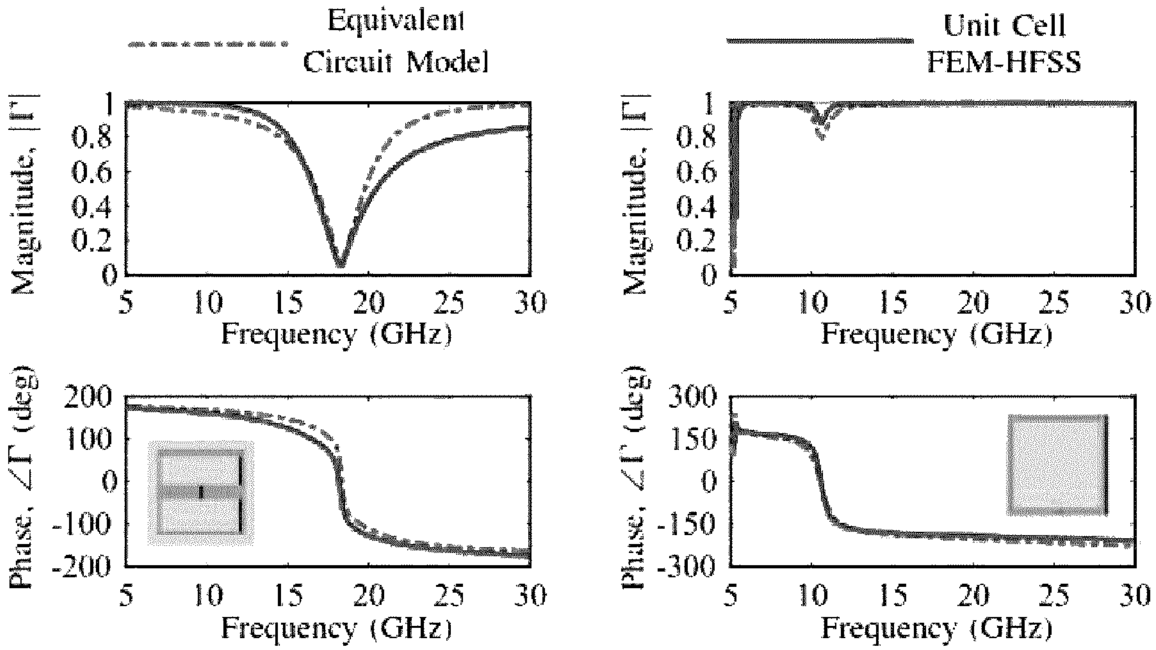
FIG. 6C shows comparisons of the simulations of the circuits in FIGS. 6A and 6B.

The equivalent circuit models of the two single resonators were simulated using the advanced design simulator (ADS) and compared with the full-wave finite element simulator (HFSS) for a wide-range of frequency bandwidth. The full-wave response of the unit cells were curve fitted by numerically finding various lumped element values of the equivalent circuit model. FIG. 6C compares the full-wave simulation of the reflection's magnitude and phase with the obtained responses by the lumped element circuit models from 5-30 GHz for the DRR when its gap (or its equivalent in the circuit model) is loaded with a resistance of R=50Ω and for the SRR when its gap (or its equivalent in the circuit model) is loaded with a capacitance of C=0.18 pF. The full-wave simulation results of the two resonators show good agreement with their equivalent circuit models for large value ranges for the loaded elements R and C.

Coupled Resonator (Dipole-Split-Ring)

Figure 7A:
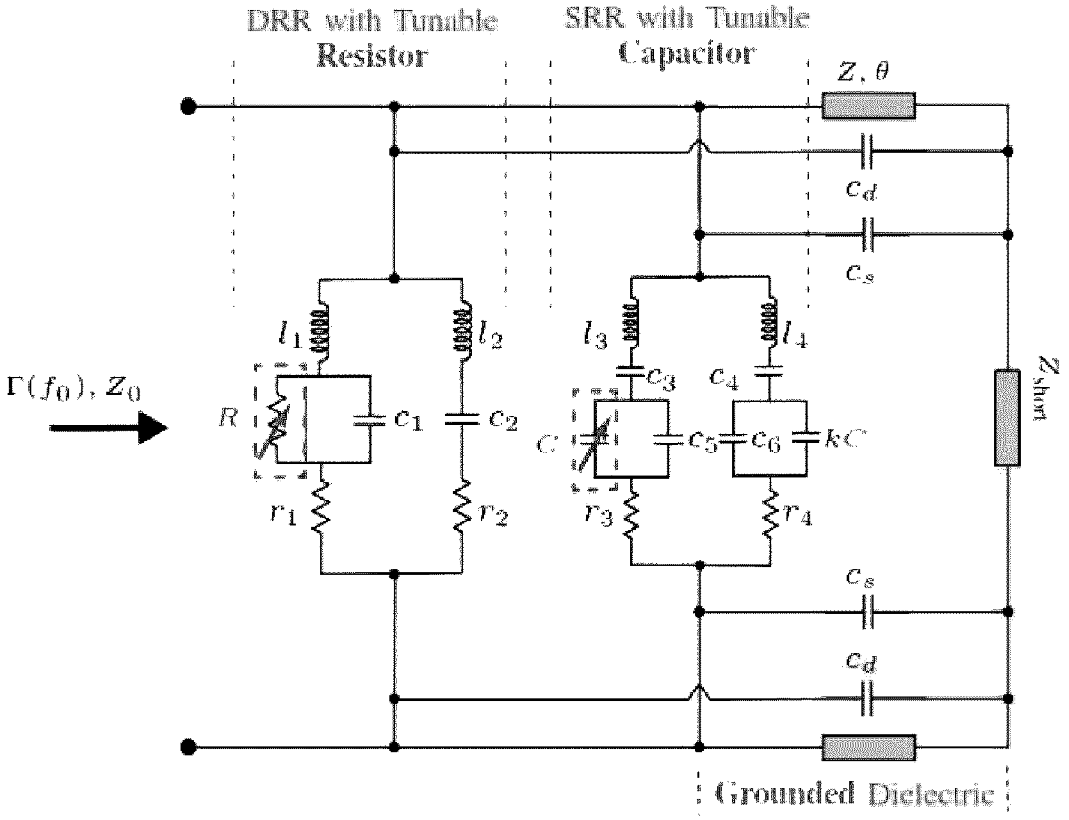
FIG. 7A shows an equivalent circuit model for the coupled resonator based metasurface unit cell according to one aspect of the present invention.
Figure 7B:
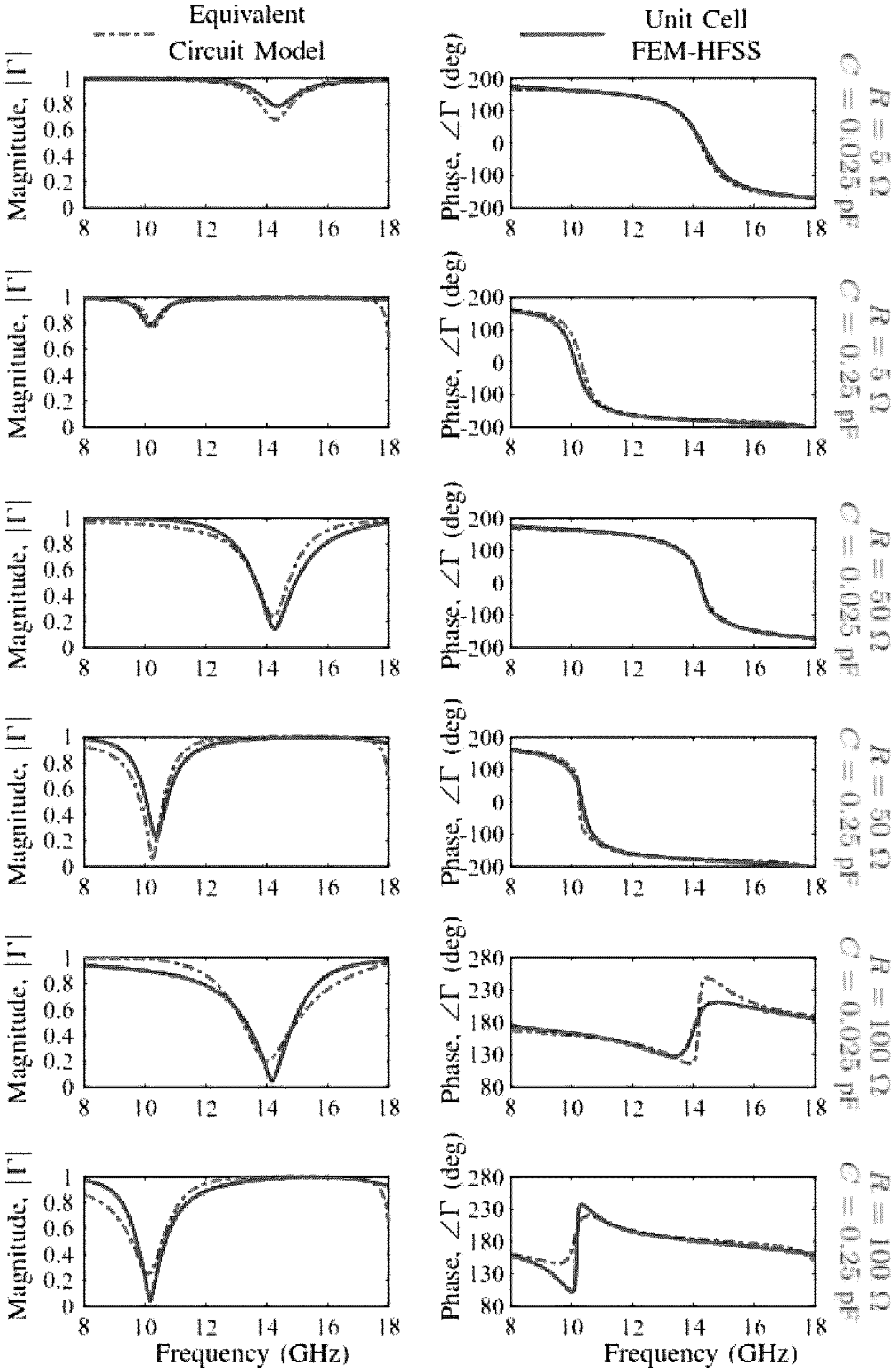
FIG. 7B shows plots that compare the simulation results with equivalent circuit model results for different resistance and capacitance values.

The metasurface unit cell of the present invention is next modeled using the above circuit models for the isolated resonators. The DRR and SRR circuit models above were superimposed to model the equivalent circuit model of the metasurface unit cell according to one aspect of the present invention. FIG. 7A shows the superimposed configuration for the metasurface equivalent circuit model, with the detailed parameters for the lumped elements being listed in Table 1. Once the two unit cells are superimposed, they are electromagnetically coupled. This coupling, as a result, perturbs the various circuit element values. FIG. 7B compares the reflection's magnitude and phase for the metasurface unit cell with the obtained responses from the equivalent circuit model using different values of R and C for the loaded resistance and capacitance. The metasurface's circuit model magnitude and phase responses show good agreement with the obtained full-wave simulation results.

Figure 8A:
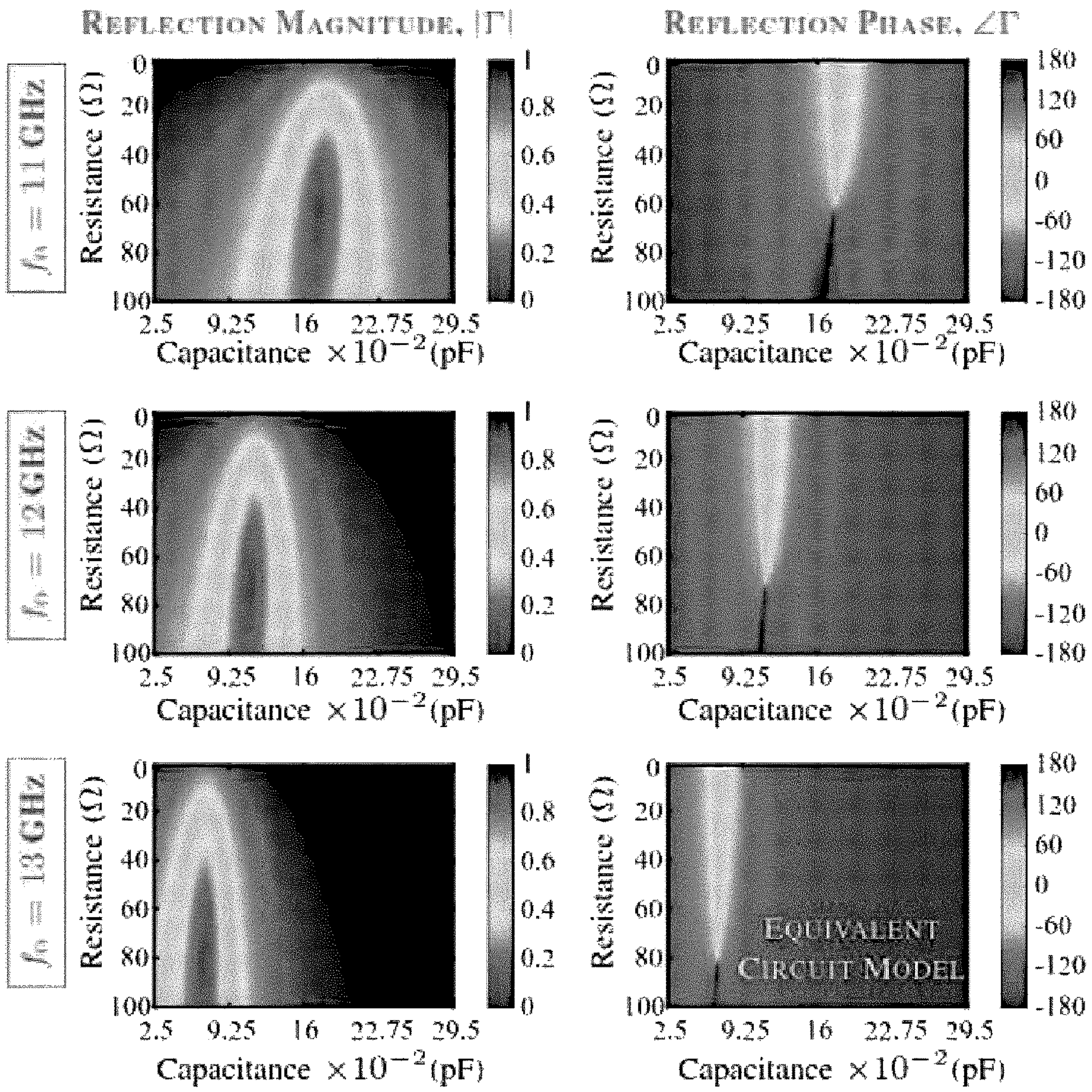
FIGS. 8A and 8B show two dimensional contour views for the equivalent circuit model and the simulated implementation of the metasurface.
Figure 8B:
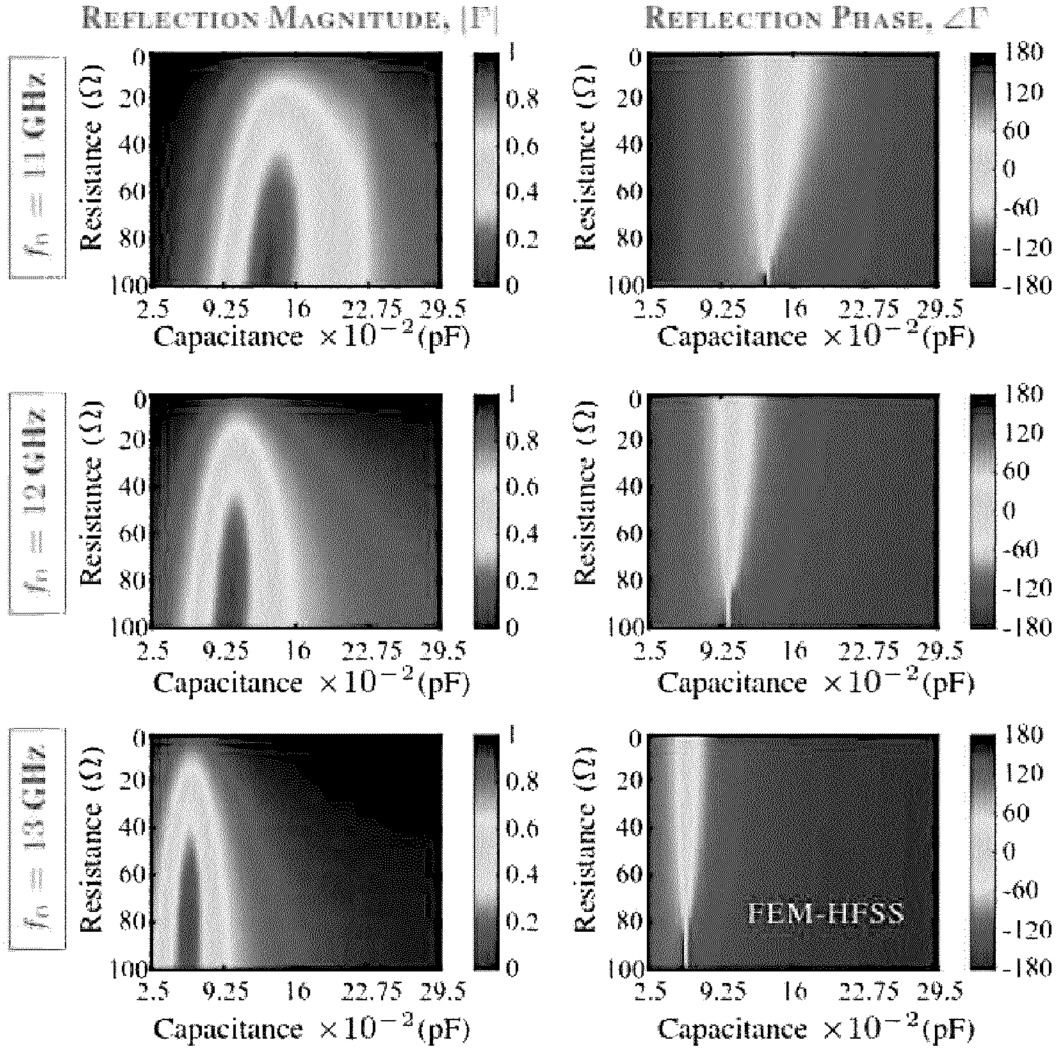

One major motivation for building an equivalent circuit model for the metasurface is that the equivalent circuit model allows for a faster approach than the full-wave simulation towards examining the coverage range for magnitude and phase of the metasurface. FIG. 8A shows two-dimensional contour views of the reflection's magnitude and phase coverage for the metasurface unit cell obtained using its equivalent circuit model at three different frequencies. The capacitance values C that were used ranged between 0.025-0.295 pF and the resistance values R ranged between 1-100Ω (typical among commercially available off-the-shelf varactor and PIN diodes). Similarly, the full-wave simulator HFSS was used to compare those contour coverages obtained by the equivalent circuit model at different operating frequencies as shown in FIG. 8B. The contour views of the reflection magnitude and phase coverages show similar trends and frequency variations for results obtained using the equivalent circuit model and full-wave simulator. The results shown in FIG. 8 substantiates the equivalent circuit model and also shows that the metasurface cells can have similar reflection magnitude and phase coverage at different operating frequencies.

Figure 9:
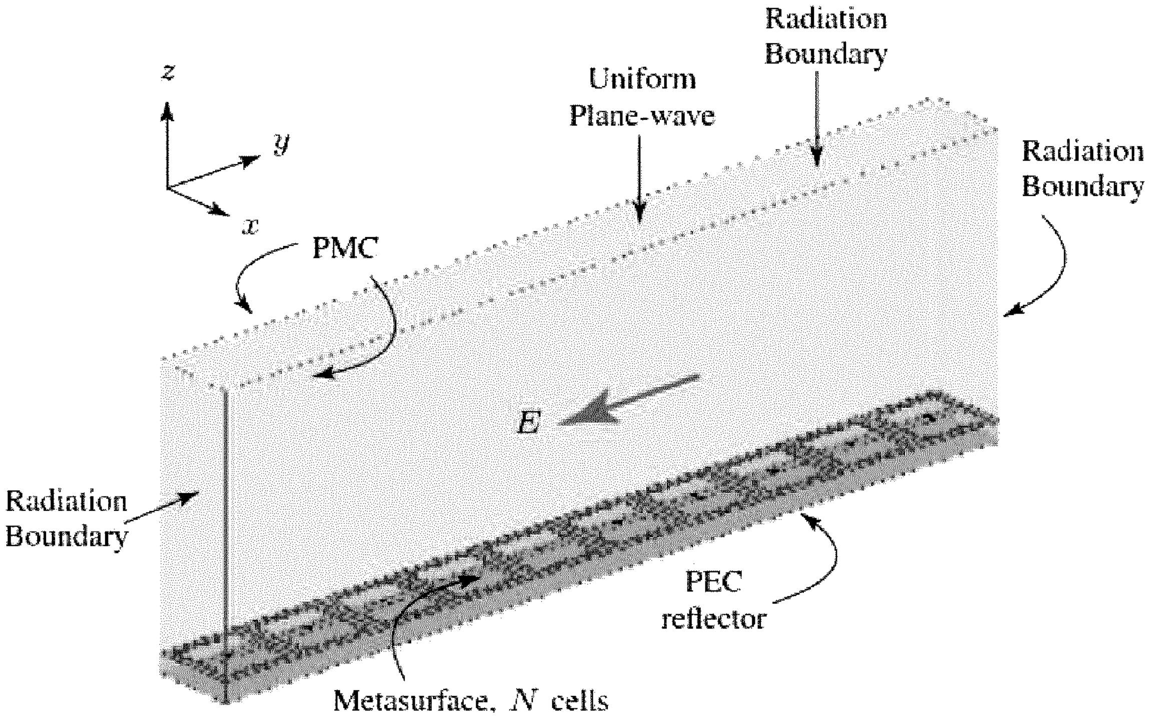
FIG. 9 shows a simulation set up as used in the simulations used to assess the various aspects of the present invention.

Provided below are different numerical examples that show how the metasurface can meet specific beam-forming, tilting, and splitting specifications using simultaneous amplitude and phase control. The control over the resulting amplitude and phase of the reflected wave is obtained through integrated active resistors and capacitors. The HFSS simulation setup to model a coupled array of identical unit cells forming the metasurface is illustrated in FIG. 9 (for reasonable computational time). The amplitude and variation in phase are obtained by varying the lumped elements (and not the geometry) across the surface. The finite size metasurface is assumed to be excited by a normally incident plane-wave along the z-axis with an E-field polarized along the y-axis. In addition, the metasurface structure is assumed to be uniform along the x-axis using PMC (perfect magnetic conductor) and PEC (perfect electrical conductor) boundaries, respectively. Radiation boundaries enclose the structure top and sides. A fixed operation frequency of 12.5 GHz is assumed in all the examples below.

As noted above, FIG. 9 shows a simulation setup in FEM-HFSS for a finite size metasurface consisting of N unit cells with N lumped resistors and capacitors. In this setup, the unit cell array is excited with a normally incident linearly polarized plane wave.

It is well-known that having linear array elements that have a uniform effect on the magnitudes of reflected waves with constant phase progression will produce a maximum reflection beam directed broadside to the axis of the excited linear array elements. Accordingly, the analysis of the reflection response of metasurface structure begins by imposing uniform magnitudes (i.e., a uniform effect on the magnitude of reflected waves/beams) and constant phase progression on the metasurface's cells. The concept is that the analysis will show if the metasurface is able to meet required specifications given the uniform magnitudes and constant phase progression. Two examples with different uniform field magnitudes (normalized to input fields) of 0.3 and 0.8 were considered with constant phase. Following this approach, an array factor pattern of a 20-element linear array with an inter-element spacing of λ/8 is assumed with a required specification of producing two broadside reflection gains (i.e. using uniform elements magnitude of 0.3 and 0.8 with constant phase progression). The choice of such magnitudes is strictly used to illustrate the gain reflection capability of the metasurface while other magnitude values can be assumed. The inter-element spacing is λ/8 and this is determined strictly based on the unit cell size at the operating frequency of 12.5 GHz. Thus, the array elements specifications to meet the broadside reflection requirement are: N=20, d=λ/8, β=0, and $a_n$=0.3 and 0.8.

Figure 10A:
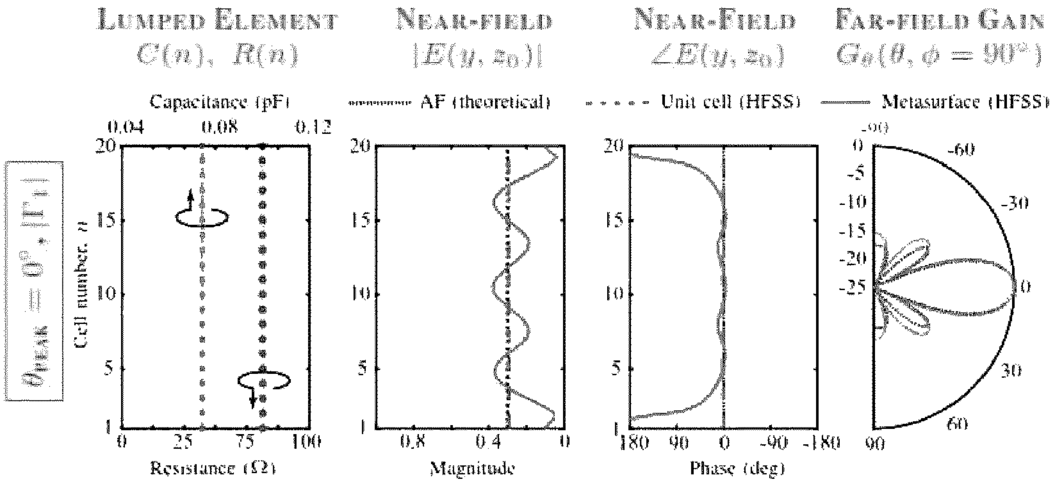
FIGS. 10A-10D show results for experiments and simulations involving beam-deflection with variable gain control.
Figure 10B:
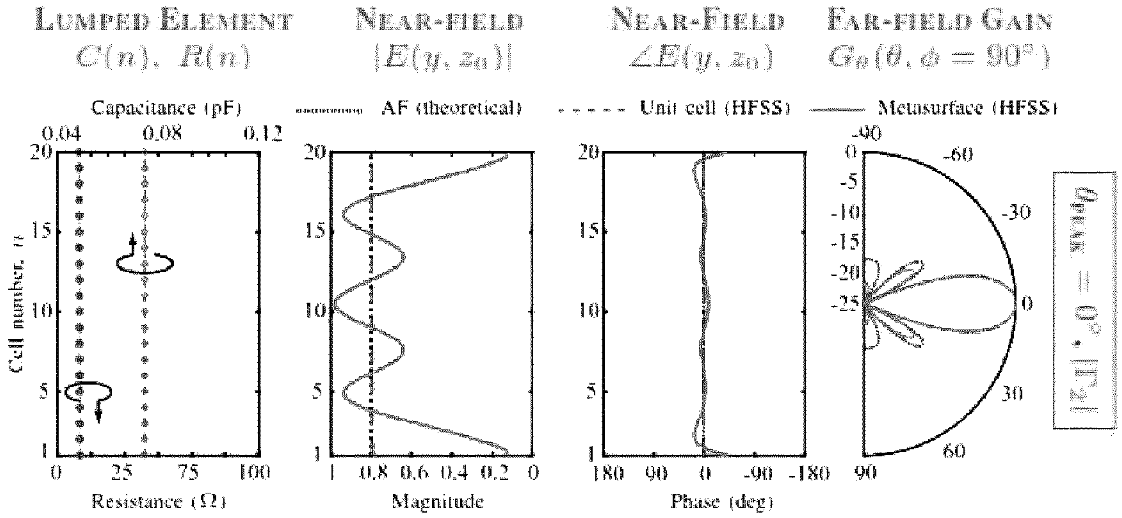

Appropriate values for the resistors and capacitors in the unit cells were then chosen using the lookup tables similar to the contour plots of FIG. 8. The complex reflectance of each unit cell is next used in the array factor to compute the analytical far-fields (equivalent to uncoupled arrays, and labeled as "Unit Cell (HFSS)"), as shown in FIG. 10A and FIG. 10B. Finally, a finite-sized 1-D array of metasurfaces was built following the model of FIG. 9, and the computed full-wave response is superimposed with the AF specifications and the full-wave unit cell model (labeled as "Metasurface (HFSS)"). The measured reflection phase and magnitude shows ripples around the desired values due to stronger element couplings near the structure. As well, the results show drops in phase and magnitude near the two edges due to finite structure size. Despite these small deviations, very good agreement between the far-field AF specifications, physical unit cell phase AF, and the finite-sized metasurface structure were obtained.

Figure 10C:
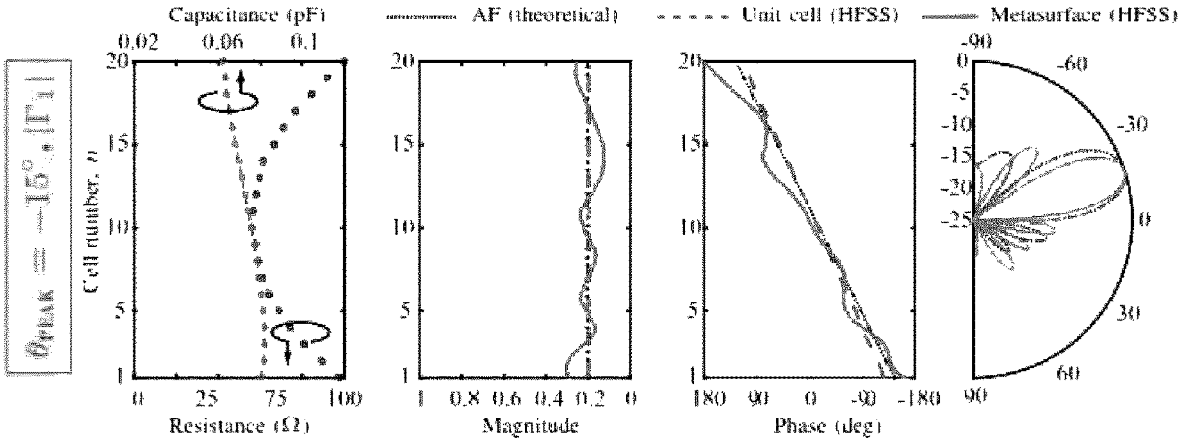
Figure 10D:
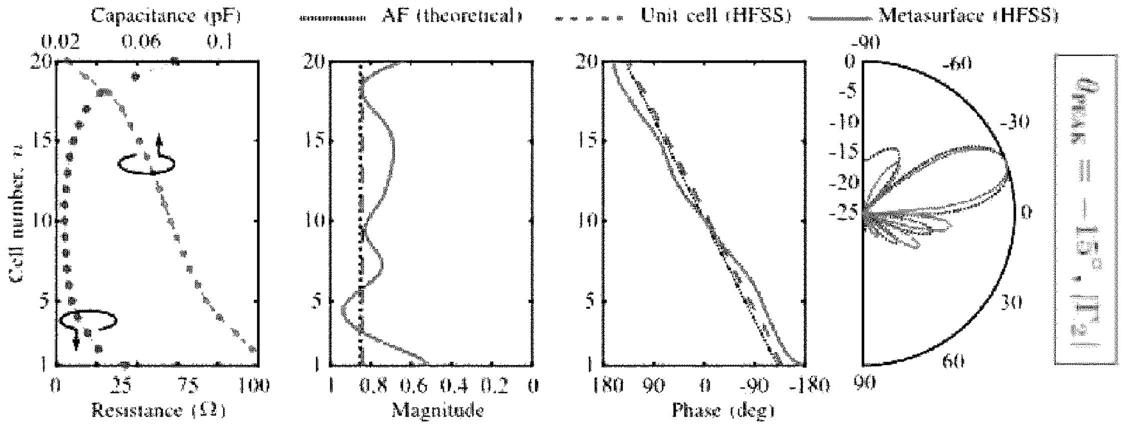

In addition to having a constant phase progression with uniform magnitudes, the metasurface may also be used to meet other requirements. The metasurface reflector, as will be explained below, may be used to meet a requirement of having a linear phase progression where the beam is tilted with two different uniform magnitudes. The required specifications for this were to have the maximum of the array factor of the uniform linear array with a beam-tilting angle of −15° from the broadside to the axis of the array, while controlling the reflection (0.2 and 0.85, respectively). Similar to the above, the necessary resistance and capacitance values were extracted and the array factors for the specifications, for coupled and uncoupled arrays, were computed. FIGS. 10C and 10D show the array factor patterns of a 20-element uniform broadside array of two maximum reflection of normalized magnitude of 0.2 and 0.85, respectively, where N=20, d=λ/8, β=0.2, $a_n$=0.2 and 0.85.

FIG. 10 shows the results of simulations for different configurations of the metasurface. FIG. 10A-B shows the results for the metasurface for beam-deflection with variable gain control with a specified peak reflection of 0.3 (FIG. 10A) and 0.8 (FIG. 10B) with no beam deflection. FIG. 10C shows the results for a specified peak reflection of 0.2 with a beam deflection of 15° while FIG. 10D shows the results for a specified peak reflection of 0.85 with beam deflection of 1°. For these simulations, a normally incident plane-wave is assumed and the metasurface consists of 20 cells. Each plot shows the resistance R and capacitance C variation across the surfaces, along with spatially varying magnitude and phase. Array Factor (AF) shows the ideal element distributions while "unit cell" corresponds to a physical unit cell simulated in HFSS with Floquet boundary conditions. The "metasurface" tag in the plots corresponds to a non-uniform full-wave structure with varying R and C. The reflected scattered fields are shown in the far-field using radiation pattern plots.

For the configuration noted above, since a uniform magnitude and non-uniform phase distribution were desired, the resistance and capacitance values ($R_n$ and $C_n$) must vary across the surface. These are can be chosen using the lookup tables similar to FIG. 8 for the operating frequency of 12.5 GHz. The lumped elements variation is also shown in FIG. 10 for all cases and this makes the metasurface electrically non-uniform. The corresponding near-field and far-field responses shown in FIG. 10 show very good agreement with specifications in that the desired beam tilt with the desired gain was obtained. The capacitance and resistance values used for the simulations are detailed in the Tables attached at the end of this document.

Figure 11A:
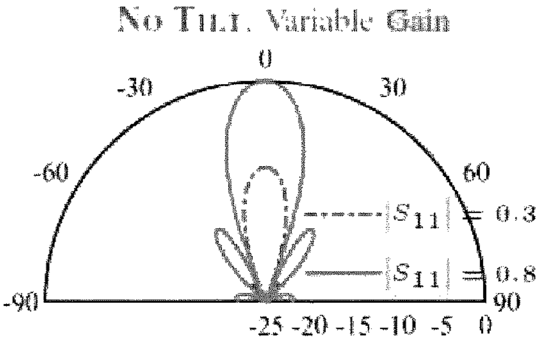
FIGS. 11A and 11B show normalized far-field radiation patterns resulting from simulations for a finite metasurface of 20 coupled cells.
Figure 11B:
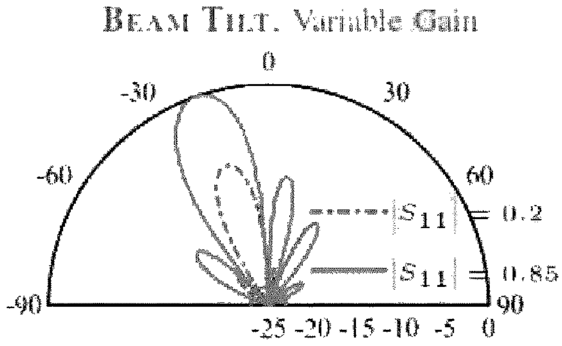

FIG. 11A shows the results of controlling the reflection gain for the metasurface similarly configured as in the above two examples. The plot compares the far-field radiation patterns for the two uniform field magnitudes of 0.3 and 0.8 with a constant phase. FIG. 11B shows the refection gains for the two examples where there is a linear phase progression and where the beam was tilted at an angle of −15° from broadside. Clearly, the resistance control in the DRR provides gain tuning in the far-field, producing results ranging from a near-perfect reflection (while accounting for dissipation losses) to perfect absorption.

FIG. 11 shows the normalized far-field radiation patterns obtained by the FEM-HFSS for a finite metasurface of 20 coupled cells. In FIG. 11A, shown are the patterns for a constant phase progression with two uniform field magnitudes of 0.3 and 0.8. In FIG. 11B, shown are patterns for linear phase progressions with different field magnitudes of 0.2 and 0.85.

Further simulations that imposed more sophisticated scenarios were also implemented. For these scenarios, assumed were specific side lobe levels (grating lobes) that were required for broadside reflection as well as for achieving beam deflection. Thus, in these scenarios, the metasurface needed to maintain a lower side level and to exhibit non-uniform magnitudes with constant and linear phase progression. In one example, the requirement is to have a reflection in a broadside direction. This example assumes that the specifications need maximum side lobes at least 25 dB below the main lobe and directed along broadside while the main beam width is as small as possible. To meet these specifications, all elements will have the same phase excitation (i.e. constant progression phase) and non-uniform magnitude excitation of the array elements. For the element magnitude, a Chebyshev array of N=48 elements and inter-element spacing of d=λ/8 was chosen, as Chebyshev profiles are well-known to provide equi-ripple side-lobes according to antenna theory. The Chebyshev AF of N-element array requires a Chebyshev polynomial $T_m(z)$ of m=N−1 order that is defined as follows:

$$T_m(z) = \begin{cases} (-1)^m \cosh\{m \cdot \cosh^{-1}|z|\}, & z - 1 \\ \cos\{m \cos^{-1}(z)\}, & -1\ z1 \\ \cosh\{m \cosh^{-1}(z)\}, & z \geq 1 \end{cases} \quad (2)$$

In the above, the ratio $R_0$ of major to minor lobe intensity is the maximum of $T_{N-1}$ that is fixed at an argument $z_0$ ($|z_0|<1$) where $T_m^{max}(z_0)=R_0$. The specified AF using the Chebyshev polynomial is then found by determining the coefficients for each power of z that satisfies an $R_0$ of 25 dB for a broadside beam with β=0. Complex weights are obtained for the array element excitations. FIG. 12 shows the results for an example of this Chebyshev linear array with a broadside beam. The results in FIG. 12 shows a comparison for the required AF specifications between the unit cell and the metasurface. A near-perfect magnitude and phase response are observed, and again, despite the constant phase, both R and C are varied across the surface. Consequently, an excellent match between the realized pattern and the specifications is observed in the far-field.

In addition to the requirements above of having maximum side lobes with at least a 25 dB below the main lobe of an array factor, another requirement was added—that of requiring that the reflected beam be tilted with an angle of 7° from the broadside. This investigation into non-standard magnitude distributions was performed mainly to determine how well the surface will follow such distributions. In one aspect, the the array elements' magnitude is in a form of an approximate binomial distribution defined as follows:

$$a_n = \begin{cases} 1 - 0.9^n, & lforn = 1 \text{ to } N/2 \\ 1 - 0.9^{(n-(2m+1))}, & llforn = (N/2+1) \text{ to } N; \\ m = 0 \text{ to } (N/2 - 1) & \end{cases} \quad (3)$$

For the above, a 48-element linear array with an inter-element spacing of d=λ/8 and non-uniform amplitudes was again used (i.e. the approximate binomial expressed on Eq. 3). An array factor pattern satisfying those specifications was obtained for a 48-element array (N=48, d=λ/8, β=0.1 rad/m). FIG. 12B shows and compares the required specifications' AF with both the unit cell (i.e. with capacitances and resistances obtained from the uncoupled metasurface unit cell) and the finite linear metasurface array. Again, a clear beam tilt with low side-lobes is obtained as a result of simultaneous variation of phase and magnitude across the surface.

Figure 12A:
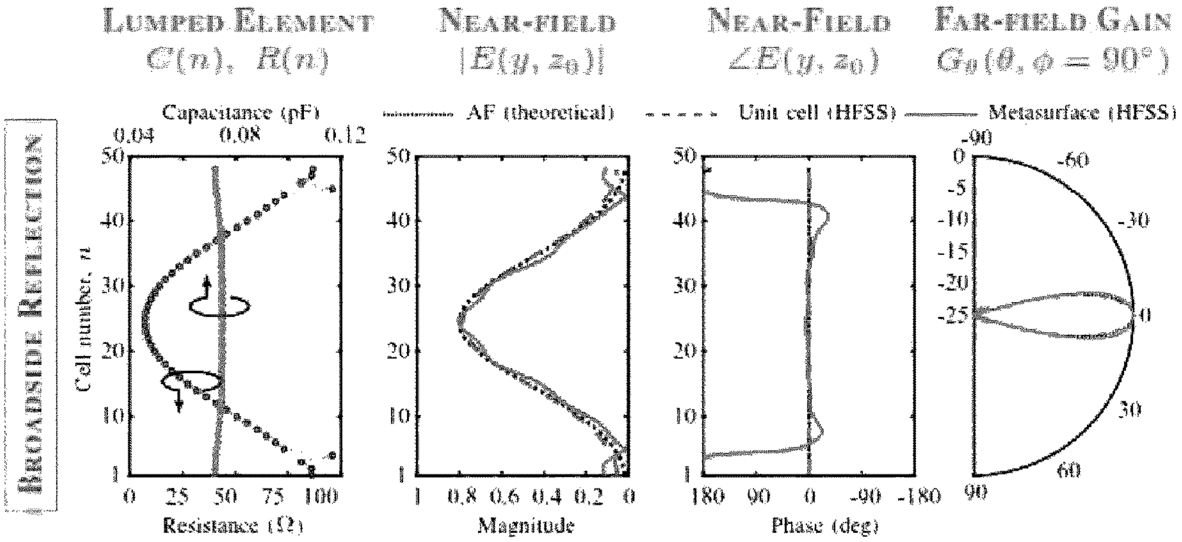
FIGS. 12A and 12B show the results for a metasurface reflector for beam-deflection with controlled side-lobes.
Figure 12B:
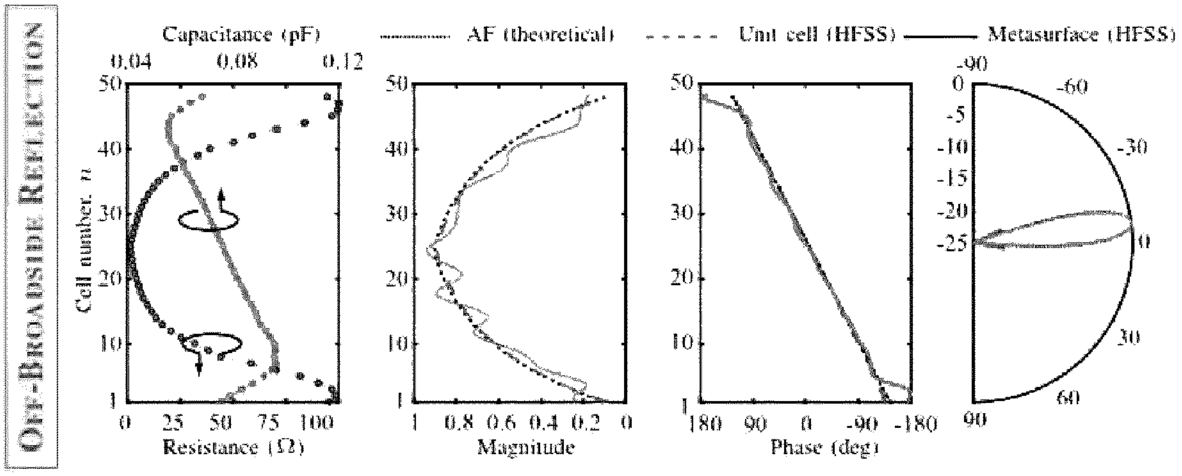

In FIG. 12, the results for a metasurface reflector for beam-deflection with controlled side-lobes (minimum 25 dB below peak gain) are shown. In FIG. 12A, the results are shown for a Chebyshev magnitude distribution with a constant phase progression (no beam deflection) while in FIG. 12B, the results for an approximated binomial magnitude distribution and a linear phase progression (beam deflection) are shown. A normally incident plane-wave is assumed, and the metasurface is 48 cells long. The capacitance and resistance values used for the simulations are detailed in the Tables attached at the end of this document.

Figure 13A:
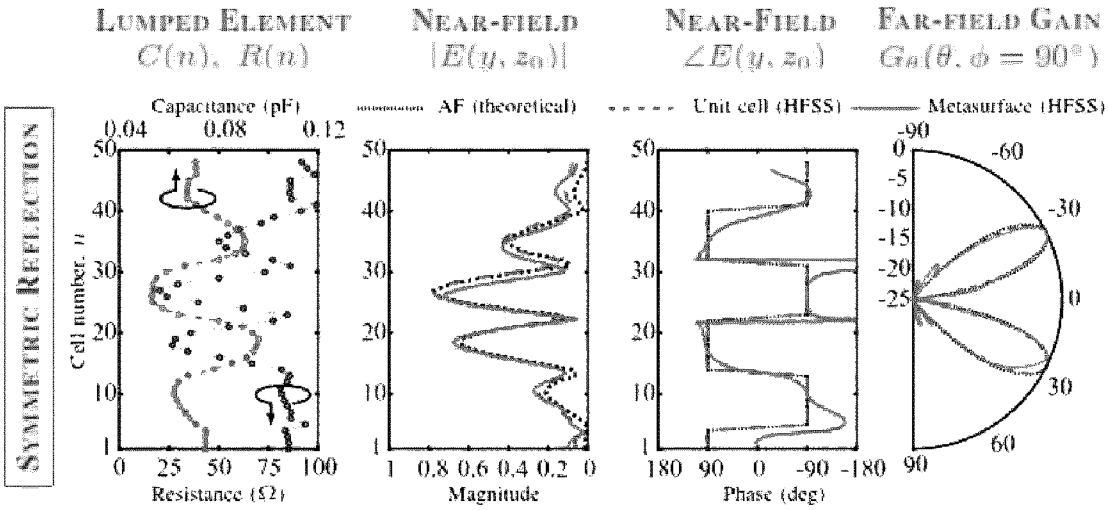
FIGS. 13A and 13B show the results for a metasurface reflector used for dual-beam scattering.
Figure 13B:
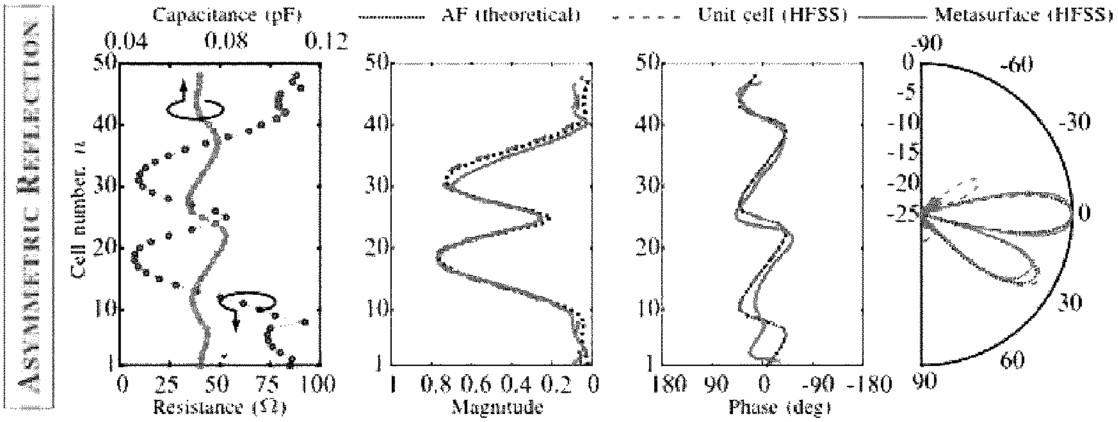

Further experiments and simulations were carried out using other requirements. In one set of simulations, the metasurface reflector was tested by specifying that multibeams in reflection were needed. In one test, the requirement for the metasurface is that there must be a two-beam reflection with identical gains per beam. Additionally, one beam is to be tilted at 27° from the broadside while the other beam is tilted at −27° from the broadside with a major-to-minor lobe ratio of $R_0$=60 dB. The Chebyshev array is used to meet such specifications. The two beams are produced using linear phase progressions of (β=0.35 rad/m) and (β=−0.35 rad/m) to satisfy the required tilting angles of ±27°, respectively. FIG. 13A shows the resulting two identically directed beams with minimum side lobes with identical gains as compared to the specifications. As can be seen, the two beams are in excellent agreement with one another. The second specification requirement is a more general one—the specification requires two beams having different gains where the higher gain beam is on the broadside while the other beam is at a 30° angle from the broadside with major-to-minor lobe ratio of $R_0$=40 dB, i.e. two beams with asymmetry. The broadside beam with the higher amplitude weights beam has a constant progression phase with β=0, while the beam tilted at 30° from the broadside has a linear phase progression with β=−0.38 rad/m. The resulting two-beams with minimum side lobes with different reflection gains are shown in FIG. 13B. As can be seen, when compared with the required specifications, the beams are in very good agreement with these specifications. From these examples, simultaneous magnitude and phase control can produce results as such asymmetric beams. These results cannot be easily realized using only either magnitude or phase control.

FIG. 13 shows results for a metasurface reflector for dual-beam scattering. In FIG. 13A, the results are for two symmetric beams with respect to broadside. These beams have equal peak magnitudes as well as reduced side-lobe levels following a Chebyshev magnitude distribution. FIG. 13B show the results for two asymmetric beams with reduced side-lobe levels following a Chebyshev magnitude distribution and unequal peak magnitudes. A normally incident plane-wave is assumed for both scenarios, and the metasurface is 48 cells long. The capacitance and resistance values used for the simulations are detailed in the Tables attached at the end of this document.

It can be seen from the contour views (shown in FIG. 8) that the coupled resonator structure with a fixed unit cell period A is capable of operating at different frequencies. Each operating frequency requires a different range of resistances and capacitances to produce a maximized coverage of the reflection's amplitude $|\Gamma(f_0)|\in[0, 1]$ and phase $\angle\Gamma(f_0)\in[0, 2\pi]$ independently. The impact and importance of the unit cell size on the realized magnitude and phase is explained further below.

The above full-wave examples of metasurfaces with real-time independent magnitude and phase control were configured to operate at a frequency of 12.5 GHz. The metasurface unit cell is λ/8 at this operating frequency and has independent reflection magnitude and phase coverages as shown in FIGS. 4A and 5B. For this configuration, capacitance ranges between 0.025-0.295 pF were used while resistance ranges between 1-100Ω were used. This range of capacitances can cover a wide range of frequencies as suggested in FIG. 8 but implementations may be configured, using a smaller range of capacitances, to operate at a single operating frequency while maintaining the reflection and phase coverages. This may be done, for example, for greater tuning sensitivity. As an example, capacitance values ranging between 0.025-0.16 pF are sufficient to operate at a frequency of 12.5 GHz and to, thereby, obtain independent reflection magnitude and phase (refer to FIG. 4A). Increasing the capacitance range will only produce replicas of similar independent magnitude and phase points. For this, please refer to the monochromatic color on the contour view shown in FIG. 4A as well as to the redundant concentrate number of points near the lower-right region of FIG. 5B.

It can also be seen from the two-dimension contour views in FIG. 8 that, while maintaining a similar coverage of independent reflection magnitudes and phases, the capacitance range increases and moves towards larger values when operating at lower frequencies for a fixed size unit cell. For clarity, the capacitance range is defined around the valley region where the magnitude and phase vary the most. This suggests that larger capacitance values for a fixed operating frequency require an electrically larger unit cell. FIG. 14 shows the simulated reflection magnitude and phase at a fixed resistance of R=50Ω for two different sizes unit cells of λ/10 (see FIG. 14B) and λ/3.33 (see FIG. 14C), with the desired operating frequency being at 10 GHz. To maintain a similar magnitude and phase coverage, the capacitance values for the electrically larger unit cell (with a size of λ/3.33) ranged between 0.3-2.2 pF while the capacitance values are between 0.165-0.31 pF for the smaller cell (sized at λ/10). Accordingly, if one chooses to use higher capacitance values in a metasurface design, the unit cell may become larger based on its size with respect to the wavelength while maintaining similar magnitude-phase coverage. Such a relationship may be apparent through the cell geometries used in FIG. 14, where a smaller inter-cell electromagnetic coupling (due to larger cell to cell separation in the λ/3.33 case) could be compensated for by using a larger lumped element capacitance. While this allows for the flexibility of using practical varactor elements that exhibit larger lumped capacitances, larger unit cell sizes may be unfavourable as they poorly sample the required spatially varying amplitude/phase distributions. There is, therefore, a trade-off between lumped capacitor ranges and the spatial amplitude-phase discretization. A practical metasurface design must try and achieve a judicious balance between these two.

Figure 14A:
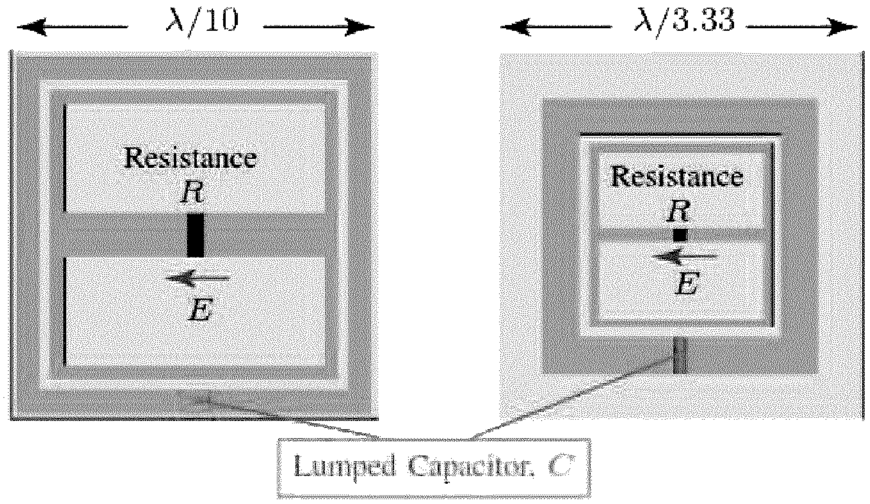
FIG. 14A illustrate the schematic of the footprint shapes for two unit cells with different sizes.
Figure 14B:
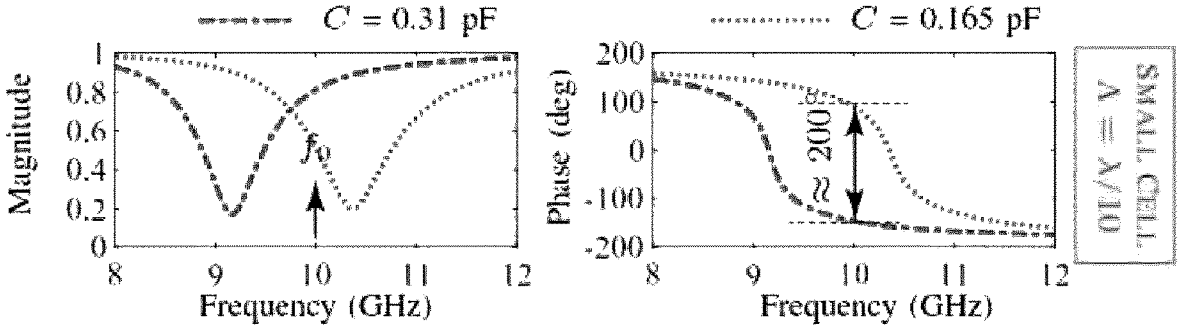
FIGS. 14B and 14C show the simulation results for reflection magnitude and phase for unit cells with different sizes.
Figure 14C:
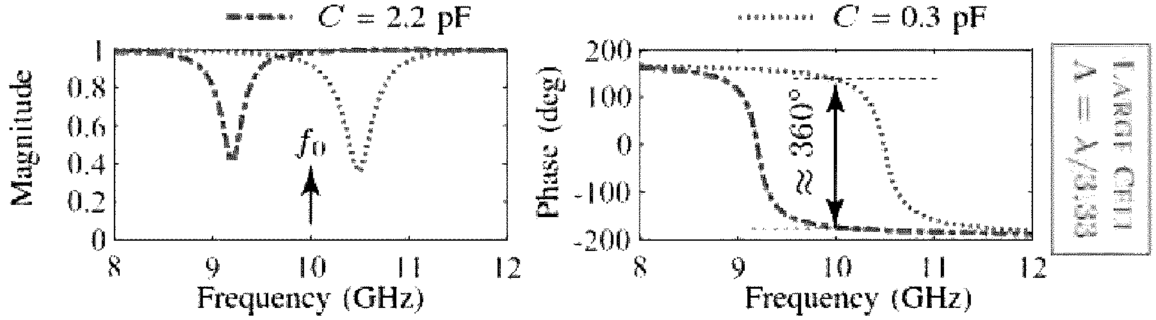

FIG. 14A to FIG. 14C are used to illustrate the impact of the unit cell sizes on the lumped capacitor ranges. FIG. 14A show top-view schematics of the foot-print shapes of the two unit cell sizes of λ/10 and λ/3.33. FIG. 14B shows the effects of a capacitance dynamic range on the simulation reflection magnitude and phase for a metasurface unit cell size of λ/10. FIG. 14C shows the effects of a capacitance dynamic range on the simulation reflection magnitude and phase for a metasurface unit cell size of λ/3.33. For both these simulations, the metasurface unit cell is operating at 10 GHz with a fixed lumped resistance R=50Ω.

In one aspect, the present invention provides a novel metasurface unit cell architecture that enables independent control of the reflection magnitude and phase at a desired operation frequency while maintaining linear polarization of the incoming fields. In one implementation, the structure is based on a coupled resonator configuration where a DRR, loaded with PIN diode as a tunable resistive element, and an SRR, loaded with a varactor diode as a tunable capacitor, are superimposed. The metasurface is operated around one of the coupled resonant frequencies. Independent tuning of the varactor and the PIN diode elements enable a wide coverage of reflection amplitude-phase and this coverage is significantly larger than what would have been achievable using a single resonator configuration. Simultaneous and independent amplitude and phase control can be used in cases of variable pattern gain with beam tilting and multi-beam pattern realization. Variable pattern gain and multi-beam pattern realization would otherwise would not be possible using only either amplitude or phase control.

This feature of independent phase control thus offers a practically useful mechanism to enable wave transformation which otherwise is not possible using existing conventional approaches, where either only magnitude or phase control have so far been shown. Since the metasurface is based on coupled resonators loaded with separate lumped elements, the biasing network is simple to design where external voltage controls can be separately designed with minimal inter-dependence. While this work emphasized on the inner workings and exploring the electromagnetic properties of the metasurface unit cell, the practical realization with external voltage biasing controls represent a standard technique for real-time control and thus pose no fundamental issue. For instance, a practical metasurface structure can be visualized having a pair of voltage controls per unit cell, so that for a surface with N×N unit cells, $2N^2$ voltage biasing lines can be used (for pixel-by-pixel control, or 2N controls for a row-by-row control). Moreover, extension to multiple polarization operation can be achieved using either a more sophisticated cell with full symmetry and an increased number of resonators or devising a super-cell where the same cell is alternately rotated by 90°. A similar concept of the super-cell may be used to extend the metasurface operation to two or more frequencies simultaneously. For example, each unit cell of the overall supercell can be operated independently via their respective R and C values. This will allow one to set the desired combinations of the reflection amplitude/phase at multiple frequencies simultaneously and independently of each other. The resulting metasurface thus subsequently can be interfaced to a control software which may provide a convenient programmatic control of the surface, where different unit cells can be independently assigned specific states, according to the desired wave transformation requirements. The metasurface thus can be real-time reconfigured to provide versatile control over the fields scattered off the surface. The control of the metasurface parameters, and hence control of the parameters of the reflected wave, may be machine learning and/or artificial intelligence based. Therefore, with flexible software programmable controls and enhanced reflection capabilities, the metasurface may truly be called a smart reflector with applications at the RF in the area of wireless communication, sensing and imaging.

The various aspects of the present invention are suitable for applications that involve radio frequencies at millimeter waves and for applications that require inexpensive materials such as commercial capacitors and resistors. The architecture detailed above is scalable to radio frequencies. As well, the architecture detailed above allows for pixel-by-pixel control and for polarization control.

In one implementation, the reflective surface, comprised of multiple unit cells each having independently controllable capacitances and resistances, may be controlled by a suitable controller that adjusts the necessary capacitances and resistances as desired. The controller may have a modular design such that, for an N×M array of unit cells, a module in the controller would control the parameters of n rows of the array. Modules can then be added or subtracted as necessary depending on the size/number of unit cells in the array. It should also be clear that the controller may be configured to adjust the parameters of the array as necessary based on sensed parameters of an incoming EM wave or based on sensed parameters of the reflected EM wave.

In one implementation, a microcontroller was used to control the individual unit cells in a metasurface array. The specifications for the controller and the associated circuitry used to control the metasurface array in this implementation are detailed in Table C attached at the end of this document.

Figure 15:
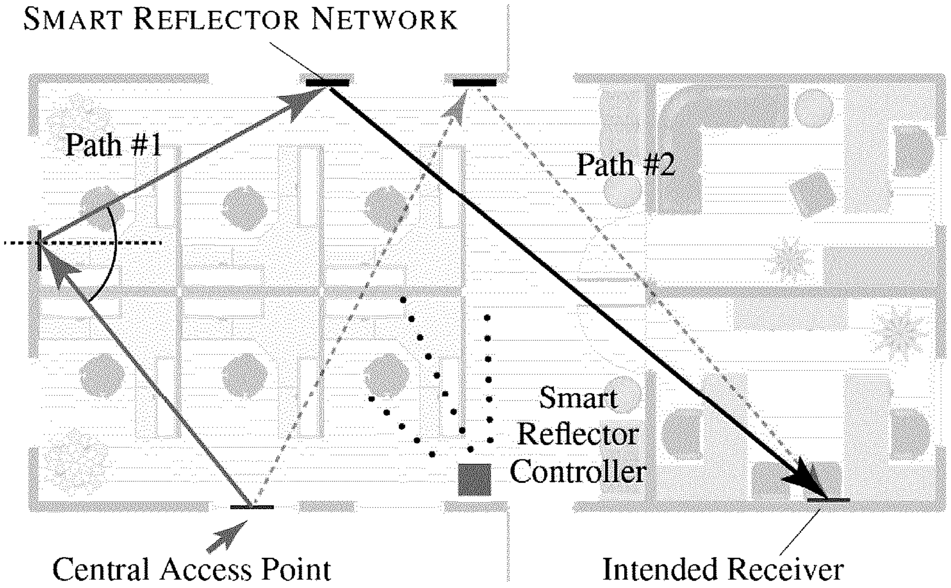
FIG. 15 is a schematic diagram illustrating a use for one aspect of the present invention.

In another embodiment, the reflective metasurface and its associated controller may be configured to allow for remote control of the metasurface. For such an implementation, an external transmitting unit will wirelessly reconfigure the surface (on a pixel-by-pixel or supercell basis) as desired. Such an implementation would use an antenna linking multiple instances of the metasurface to a reflection controller unit. The reflection controller would simultaneously communicate with multiple metasurfaces (each of which operates as a smart reflector) and the controller would reconfigure each smart reflector to form a co-operative network. The cooperative network can then be used to route and reroute EM signals in real time (or in near real time) to maintain high bandwidth and signal access. This use of the metasurface and its ability to reroute signals and/or reroute signals to different signal paths is shown in FIG. 15.

Static Unit Cell

While the above discusses metasurfaces with unit cells that have dynamic parameters that can be adjusted on the fly, other applications may not need such adjustability. For some applications, a metasurface with unit cells with fixed parameters, and thereby a fixed performance relative to incoming electromagnetic waves, are suitable. However, as with unit cells with dynamic parameters, the question may be one of how to engineer a suitable unit cell with specific parameters and performance characteristics.

In one aspect of the present invention, a unit cell with static parameters may be designed such that two control elements are used to independently tune the reflection magnitude and phase. To avoid resistance tuning, one option is to add a resonator structure in addition to an already existing resonator, resulting in a dual resonator configuration. The resonance control of each of the two resonators thus can be seen as two independent tuning mechanisms to manipulate its complex reflectance. This is more clearly seen in an equivalent transmission line model, where the two resonators are chosen to be separated by a dielectric slab, which are both placed on a short-circuited host dielectric. Each of the resonators is considered to be a series LCR resonator, where their capacitances C1 and C2 may be varied to tune their resonance frequencies. Such resonance shifts can be practically brought about by structural changes in the two resonators. While the two resonators in the equivalent LCR model may be seen as uncoupled for simplicity, in physical practical implementations, they will naturally be electromagnetically coupled.

Figure 16:
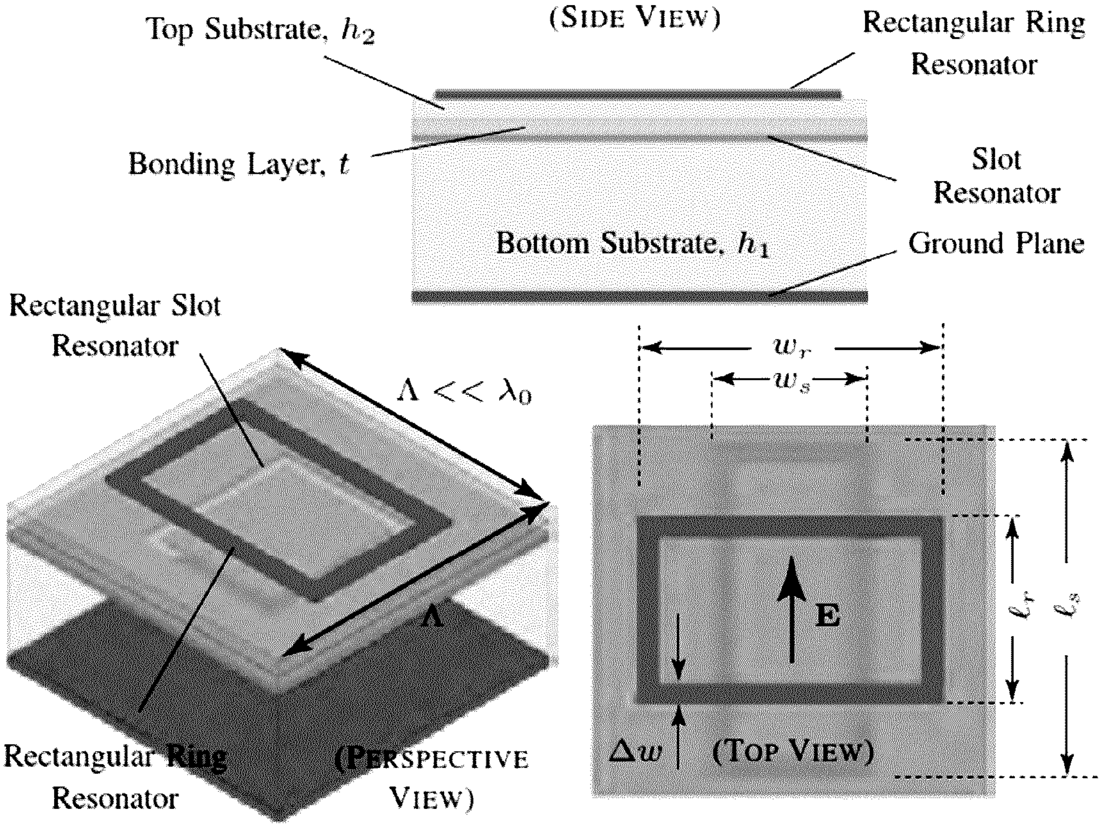
FIG. 16 illustrates one implementation of a unit cell with static parameters.

The metasurface reflector discussed above may use a sub-wavelength double resonator configuration backed by a grounded dielectric slab. A simple practical implementation of such a configuration is shown in FIG. 16. This implementation uses a rectangular ring resonator coupled with a rectangular slot resonator, which is then placed on top of a conductor backed dielectric slab (see SIDE VIEW in FIG. 16). Any change in one resonator affects the response of the second resonator via electromagnetic coupling. This can then be used to achieve independent amplitude-phase tuning. The resulting unit cell has a sub-wavelength periodicity i.e., $\Lambda \ll \lambda 0$ (e.g., 2 mm here in the example=$\lambda 0/5$ at 30 GHz). Practically, this unit cell architecture is a multi-layer configuration, as shown in FIG. 16, where the two dielectric layers are attached using a bonding layer. In one implementation, the unit cell layer stack has a ground plane of thickness 52 μm, rectangular slot of 35 μm and rectangular ring 35 μm, all being made of copper. The base substrate (h1=730 μm) and the top substrate (h2=100 μm) both are being made of Rogers 4350B, which was simulated with an $\epsilon_r$ of 3.62 with δ of 0.0037. The PrePreg bonding layer (t=110 μm) was made of Rogers RO4450F and simulated using $\epsilon_r$ of 3.8 with δ of 0.0039. 9 μm resin layers were used adjoining the metal and substrate/PrePreg which have a $\epsilon_r$ of 2.4.

The unit cell in FIG. 16 has fixed dimensions (i.e., has static operational characteristics) and operates on linearly polarized incident waves. Due to the symmetry of the structure, no cross-polarization is generated, as desired. If the slot resonator has zero width, the unit cell simply becomes a conventional single resonator structure with a uniform ground plane. The addition of a slot in that ground plane can thus be seen as introducing an effective defected ground plane structure, with an engineerable surface impedance, instead of a fixed short-circuit impedance.

Figure 17:
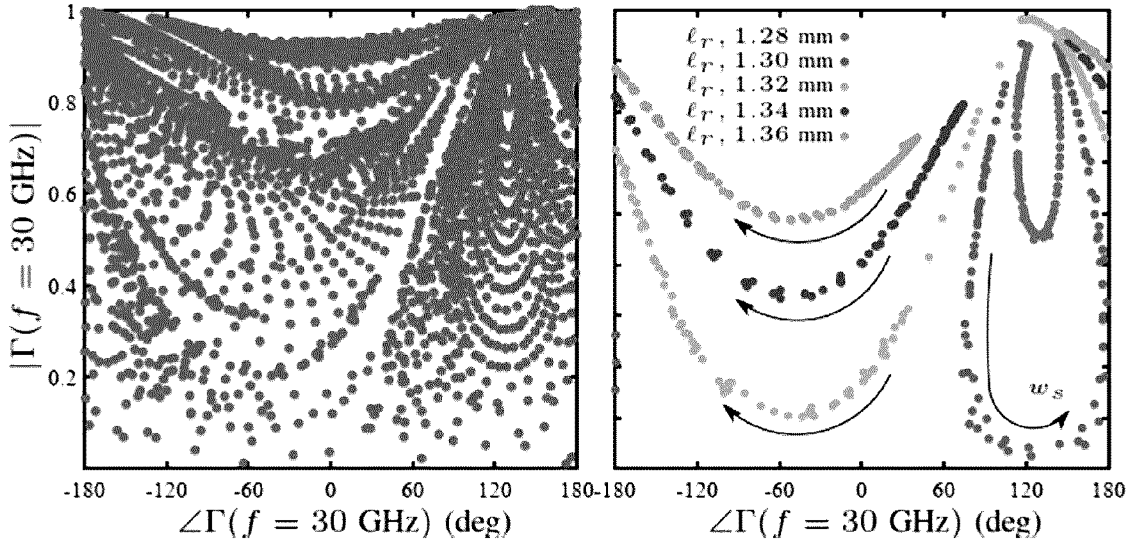
FIG. 17 show full amplitude and phase coverage achievable by the unit cell illustrated in FIG. 16.

The coupled resonators of the unit cell has several design parameters: slot resonator length, $l_s$ and width, $w_s$, ring resonator length and width, $l_r$ and $w_r$, and the ring resonator thickness Δw, while the slot thicknesses remains constant (at a thickness of 110 μm in one implementation) due to fabrication considerations. FIG. 17 [left] shows a typical amplitude and phase coverage range when excited with normally incident plane-waves, using FEM-HFSS, which are achievable using this unit cell by varying all these key design parameters for a fixed number of simulation runs and for a fixed design frequency (30 GHz, here). Each point indicates that a set of resonator dimensions could be readily found, and that a specific amplitude-phase pair is achievable. A near perfect amplitude coverage from full reflection to full absorption, and phase coverage of 2π is observed, as desired.

Figure 18:
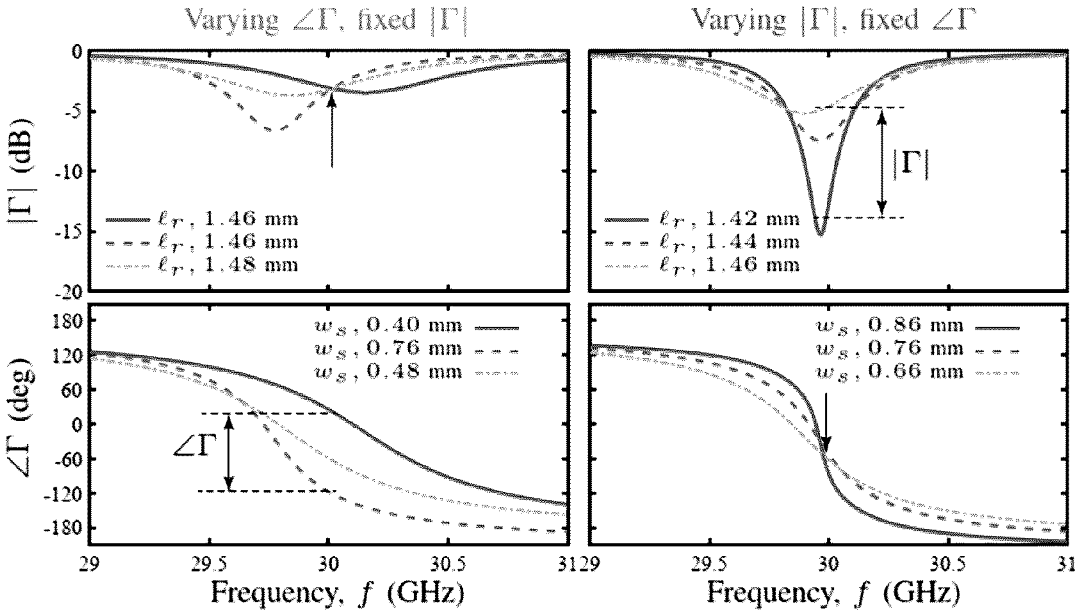
FIG. 18 show examples of results for the unit cell in FIG. 16 for a fixed reflection magnitude with varying phase and for a fixed phase with a varying magnitude.

It is further found that there is no simple relationship between the reflection magnitude and phase with the five key parameters of the unit cell. Consequently, FIG. 17 essentially serves as the main look-up table of this unit cell for 30 GHz operation frequency. A small subset of the full look-up table where all the parameters except ws and lr, are kept constant is shown in the right of FIG. 17, which indicates some useful trends in the magnitude-phase coverage plot. FIG. 18 shows two examples to illustrate an independent magnitude-phase combination response. The left figure in FIG. 18 shows specific configurations of the unit cell, where the magnitude is held constant at 30 GHz, while the reflection phase is varied. The right figure in FIG. 18, on the other hand, shows the results where the reflection phase is kept constant, but the magnitude varies from low to high reflection.

Figure 19:
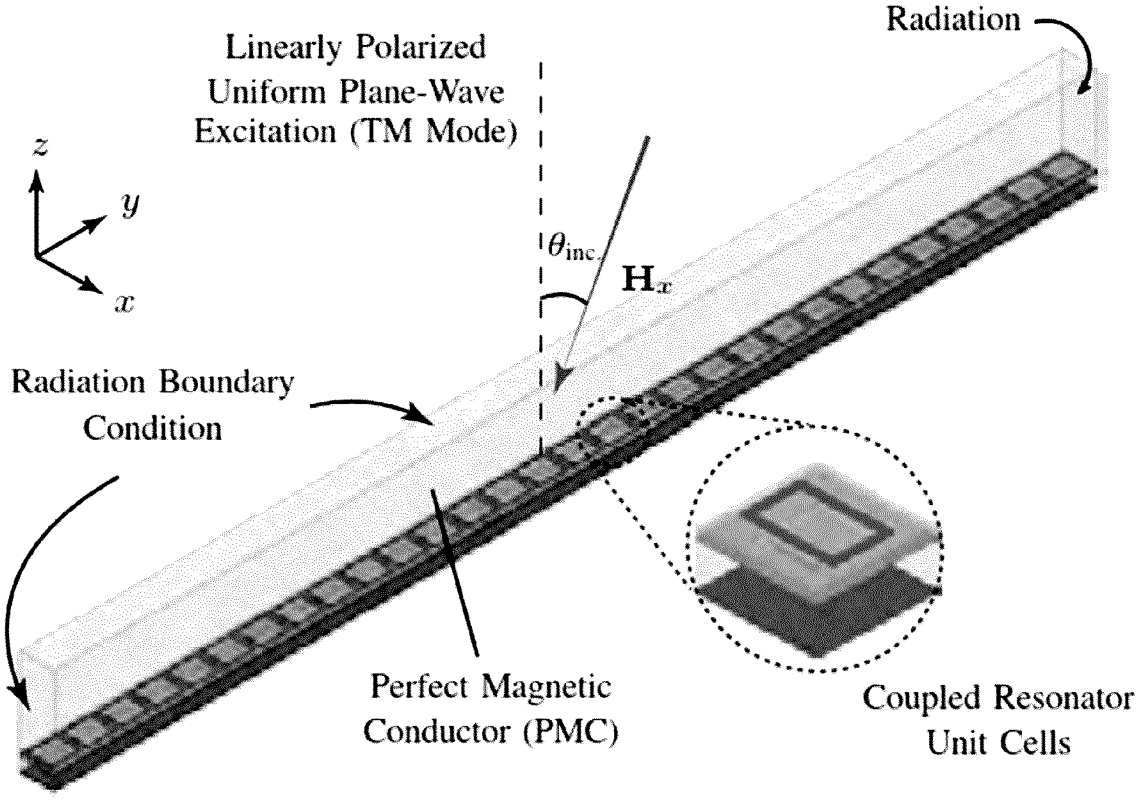
FIG. 19 illustrates a metasurface configuration using the unit cell illustrated in FIG. 16.

Given the above design of a unit cell with static parameters, a metasurface can now be designed by cascading unit cells shown in FIG. 16. These unit cells can have varying resonator dimensions to realize a spatial complex reflectance along the metasurface to achieve a specified far-field reflection pattern. A full-wave model of the N unit cell metasurface is shown in FIG. 19. The metasurface is excited with a y-polarized uniform plane-wave, and perfect magnetic conductor (PMC) boundary condition is used along the x-direction to enforce uniformity along the x-axis. The unit cell geometry is varied along y, to engineer a desired complex reflectance profile, Γ(y).

A simple way to obtain the space-dependent complex reflection profile is using standard antenna array theory, for instance, where the far-fields pattern is given by $$E(\theta) = \sum_{n=1}^{N} a_n e^{j(n-1)\{k_0 \Lambda \cos\theta\}}$$

where $k_0$ is the free-space wave number at the design frequency ω, N is the number of unit cells in the metasurface and $a_n$, is the complex reflectance of the nth unit cell. Using standard antenna array synthesis, a simple estimation of the complex reflectance can be made for desired far-field patterns. For example, the complex reflectance (an) can be calculated through a Chebyshev window. The number of unit cells (N) is provided to the function as well as the sidelobe magnitude factor which controls the beam width. This weighting factor is then multiplied by $e^{jn\beta}$ where β represents the phase gradient across each unit cell and n is the current unit cell number. This then produces N complex weighting values ($a_n$), from which the calculation for the far field is then determined through the above. The complex reflectance ($a_n$) at each unit cell is the near field required along the surface, for each unit cell and is used to confirm and converge the solution to the desired near field and thus far field patterns.

Implementation in Systems

From the above, it can be seen that two distinct designs for unit cells have been described: a unit cell with dynamic or configurable parameters and a unit cell with static parameters. Both these unit cells can be used to design/create metasurfaces with specific performance characteristics.

Figure 20:
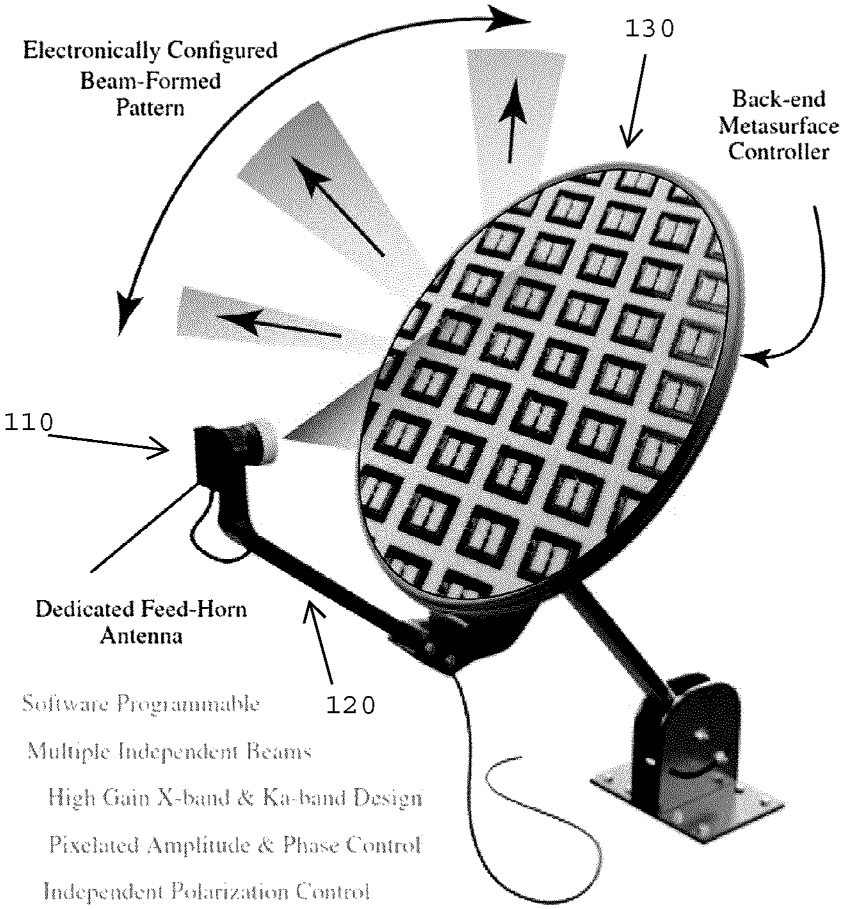
FIG. 20 illustrates an electronically reconfigurable reflect array antenna using the unit cell with dynamic parameters.

In one implementation, the unit cell with dynamic parameters is used as the basis for a Smart Reflect-Array System. This system uses a smart metasurface reflectarray antenna 100 (as illustrated in FIG. 20) has a dedicated feed-horn antenna 110 operating in the desired frequency band (microwave or mmWave) installed strategically on a mount 120, illuminating the metasurface 130, which provides the independent amplitude and phase characteristics. The electronic control circuitry will be housed behind the metasurface 130, which will provide the necessary programmable interface to generate complex radiation beams on the fly. The system may include the features of:

(a) Software programmable reflectarray antenna producing high gain beams with independently controlled beam parameters. The control system may include the necessary look-up tables and calibration procedures which may be implemented and repeated at recommended time periods.

(b) Customized and performance optimized (electrical and mechanical) for desired frequency of operation, gain and pattern specifications. The customized and optimized feature set makes the system suitable for end user applications such as, for example, satellite tracking and communication applications or direct point-to-point communication.

(c) Allows for independent polarization operation if desired. This feature may be useful for increased throughput, through polarization diversity, is desired.

(d) Configuration may include a metasurface controller equipped with a powerful microprocessor that allows for wireless programming and control. This allows for the whole system to be configured remotely, making the system convenient for installation in reach locations and higher altitudes. Of course, such a microprocessor equipped metasurface controller is preferably configured with software that allows for interfacing with other units so that communications and link establishment related feedbacks can be implemented using standard communication protocols.

Figure 21:
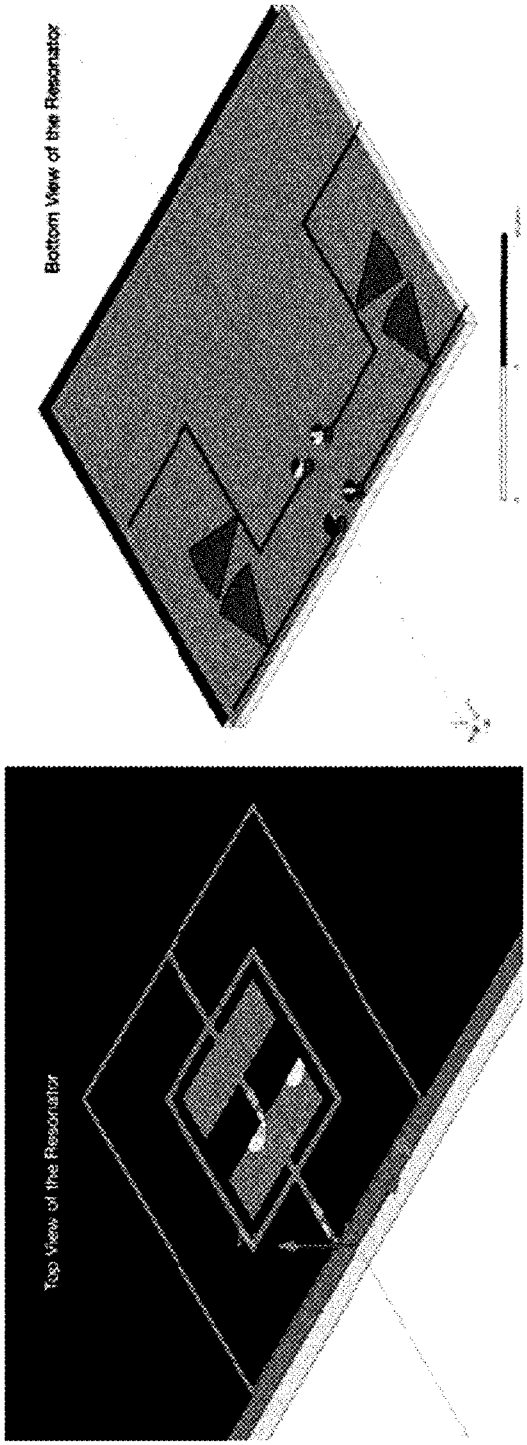
FIG. 21 shows the front and back of the dual resonator unit cell using a bias-T configuration for isolating RF and DC signal paths.

As another implementation of the unit cell with dynamic parameters, the unit cells may be RF-DC co-designed metasurface unit cells. In this implementation, each dynamic unit cell uses at least two tuning elements integrated into the coupled resonator architecture: one tuning element for controlling the reflection phase (e.g., a varactor diode) and another tuning element for controlling the reflection magnitude (e.g., PIN diode). All these elements can be externally biased and can be controlled using DC control lines which are routed from the electronic metasurface controller to the unit cells. In practice, radio frequency (RF) signals interacting with the coupled resonators not only reflect from the surface as desired, but are also coupled and guided along the DC control paths to the metasurface controller. This severely affects the desired operation of the unit cell, and significantly reduces its amplitude-phase coverage. Consequently, the DC signals paths and the RF signal paths must be completely isolated. This is achieved by integrating a bias-T circuit on the back of the metasurface. While lumped element designs are possible, a more effective, low-cost and frequency scalable solution is to use a printed radial stub that is strategically placed on the DC line paths to completely isolate RF from the metasurface controller (for both ground and DC signals). The unit cell is thus co-designed with suitable DC control paths. An example structure is shown in FIG. 21. Radial stubs are geometrically optimized for the desired frequency band of operation, and level of RF-DC isolation found sufficient for practical purposes. As can be seen from FIG. 21, the left figure shows the top view of the resonator while the right figure shows the bottom view of the resonator with the bias-T radial stubs on the DC line path.

Figure 22:
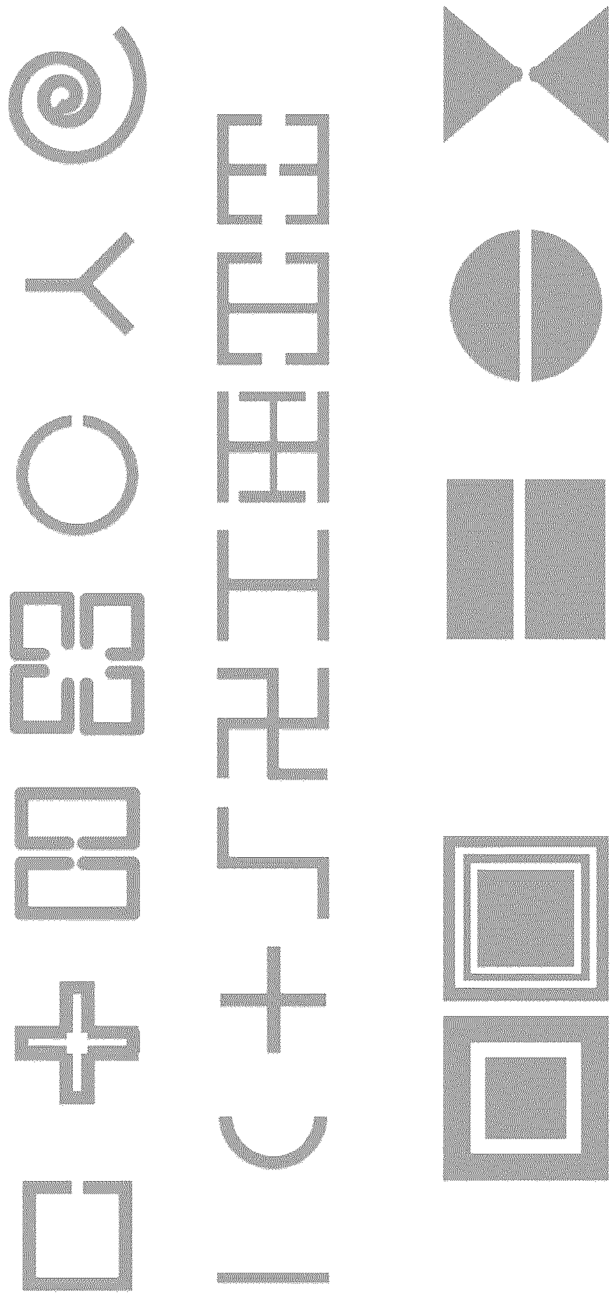
FIG. 22 show different possible shapes and configurations which may be used in multiple resonator configurations.

In another implementation, variations of the unit cell with static parameters are possible. As noted above, in one aspect of the present invention, independent amplitude-phase coverage is enabled by the presence of at least two electromagnetically coupled resonators packed inside a sub-wavelength sized unit cell. However, while the above description covers a rectangular ring resonator and a slot resonator, the variety of resonator shapes that may be used are practically endless. In addition, the physical geometrical arrangement and relative placements of these resonators are also practically endless. While the two coupled resonators may assume arbitrary complex 3D shapes and may practically occupy a sub-wavelength 3D volume, printed planar geometries are practically preferred due to their ease of fabrication using standard printed circuit board implementations, and lumped elements assemblies. The two resonators may be interleaved on a same layer and be edge or laterally coupled (e.g., the dipole ring and split ring resonator explained above) or be broadside or vertically configuration coupled as with the resonators in FIG. 16. While broadside coupled configuration adds an additional metal layer resulting in a multi-layer configuration, this vertical separation between the two resonators acts as an additional degree of design freedom that can be used to significantly enhance the amplitude-phase coverage capability of the resulting unit cell. A number of primitive shapes commonly used in realizing a variety of planar resonators are shown in FIG. 22. These shapes may further be customized to construct more complex compound shapes with optimized reflectance performance. A combination of these primitive shapes may be used to construct sophisticated shape patterns that may provide optimal performances for resonator designs. Additional variations may include the use of vertical metallization vias that can be used to connect multiple metal layers that have such resonator shapes.

Figure 23:
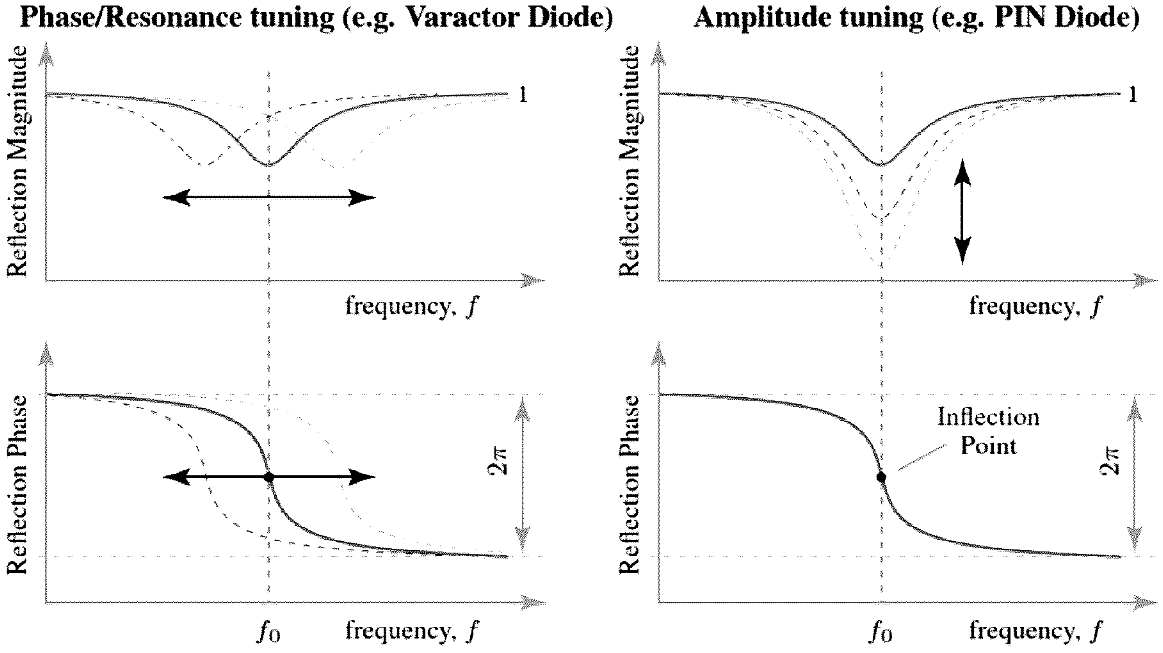
FIG. 23 show the performance for an all-electronic amplitude and phase control using varactor and PIN diodes.

In another aspect of the present invention, decoupling between the amplitude (or magnitude) and phase responses for a reflection metasurface is addressed. As explained above, a unit cell with dynamic controllable parameters and with a coupled resonator architecture has a phase control and an amplitude control. The resonant frequency of the coupled resonator unit cell is defined as the inflection point in the reflection phase across frequency, as illustrated in FIG. 23. This resonant frequency also corresponds to the lowest reflection point. This inflection point is typically the design frequency of the resonator. In an all-electronic control form (i.e., the control mechanism for controlling the dynamic controllable parameters is completely electronic), the phase is tuned typically via the varactor diode. In other words, the varactor diode controls the location of this inflection point (or resonance frequency), which moves horizontally along the frequency axis, as its voltage bias (and thus the effective capacitance) is varied. The point of lowest reflection naturally varies in the same way along the horizontal frequency axis.

On the other hand, the Q-factor of the resonator (the frequency width of the resonator and the reflection depth of the resonance) is controlled by the intrinsic losses of the resonator (including metal, dielectric, lumped element and scattering losses). The tunable resistor integrated on the second resonator thus allows one to vary the Q-factor of the resonator unit cell. This therefore allows for the control of the reflection depth, with minimal effect on its reflection response, as shown in FIG. 23. Therefore, a combined operation of varying the varactor and PIN diodes allows one to independently vary the reflection magnitude and phase at a chosen design frequency, (i.e., horizontal movement of the phase and vertical movement of the reflection magnitude). While the reflection magnitude and phase are independently controllable, and an optimal geometrical arrangement may maximize the amplitude-phase coverage, an absolute and a perfect decoupling between reflection phase and amplitude is still not possible using this configuration.

Figure 24:
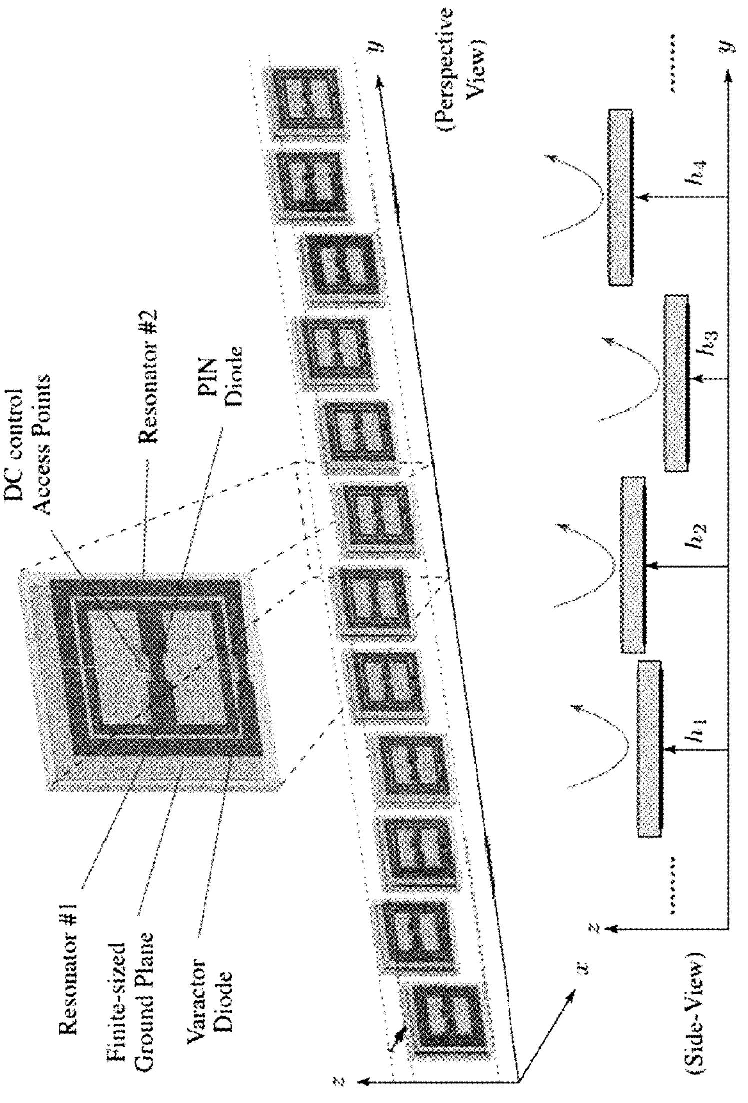
FIG. 24 schematically illustrates a system for physically displacing unit cells in a metasurface system to thereby completely decouple reflection phase from reflection magnitude.
Figure 25:
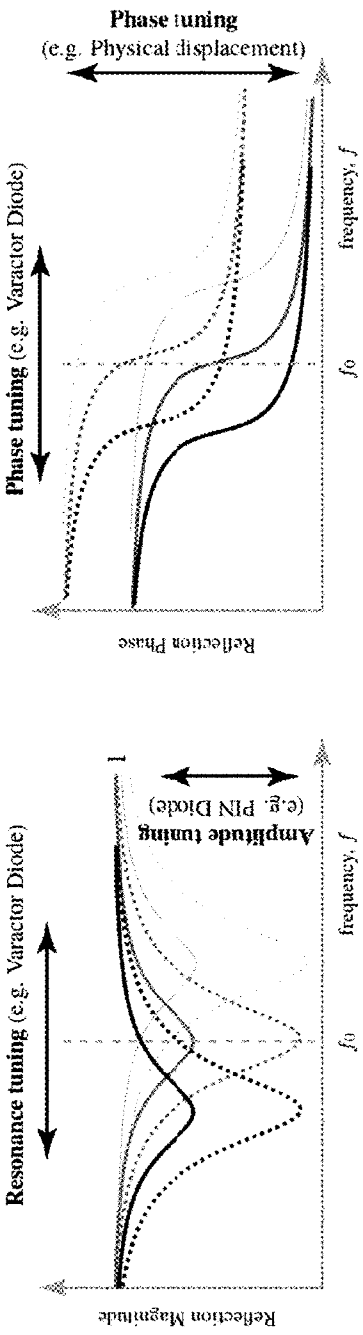
FIG. 25 shows the performance of a metasurface system using physical displacement to completely decouple reflection phase from reflection magnitude.

To achieve a perfect decoupling between the reflection phase and magnitude, a physical displacement perpendicular to the plane of the unit cell may be used. An implementation of this concept is illustrated in FIG. 24. In FIG. 24, a single row of the metasurface lying in the y-z plane is illustrated. In this row of the metasurface, each unit cell (i.e., a pixel) is allowed to be physically displaced relative to its neighbors along the z-direction. This vertical displacement function h(n) (where h is the displacement with respect to a common reference level (e.g., z=0) and n is the unit cell index), in addition to the capacitance function C(n) and resistance function R(n), allows for a complete decoupling between the reflection phase and magnitude. The maximum displacement range of $\pm\lambda/2$ at the design frequency is practically sufficient. This physical displacement allows for a vertical movement of the phase-frequency curve, while keeping the inflection point the same (i.e., no change in the resonant frequency). Consequently, the horizontal phase variation via varactor diode is complemented/fine-tuned with the vertical movement of the phase curve due to the physical displacement of the unit cell, as illustrated in FIG. 25. The magnitude variation due to resistance remains the same. For such a configuration, the tunable capacitor (e.g., a varactor diode) controls the resonance frequency and the reflection phase while tunable resistors (e.g., a PIN diode, resistance sheet) control the reflection magnitude and vertical displacement (e.g., mechanical motion of the unit cells or tunable dielectrics) tunes the reflection phase.

This use of the physical displacement of the unit cell (for a pixel-by-pixel control) or a physical displacement of a row of unit cells (for column-by-column control) motivates the deviation from an all-electronically (fully electronic device based) controlled metasurface to one that involves a combined electro-mechanical control system. Such physical displacements may be achieved using a variety of methods that may include electric motors, actuators (typically piezoelectric), and Micro-Electro-Mechanical Systems (MEMS). An effective electrical displacement may also be achieved by using electronically tunable dielectrics, such as liquid crystals and semiconductor based artificial dielectrics (e.g., volumetric metamaterial slabs). These dielectrics may be sandwiched between the resonators to thereby provide a suitable control system.

It should be clear that the various aspects of the present invention may be implemented as software modules in an overall software system. As such, the present invention may thus take the form of computer executable instructions that, when executed, implements various software modules with predefined functions.

The embodiments of the invention may be executed by a computer processor or similar device programmed in the manner of method steps, or may be executed by an electronic system which is provided with means for executing these steps. Similarly, an electronic memory means such as computer diskettes, CD-ROMs, Random Access Memory (RAM), Read Only Memory (ROM) or similar computer software storage media known in the art, may be programmed to execute such method steps. As well, electronic signals representing these method steps may also be transmitted via a communication network.

Embodiments of the invention may be implemented in any conventional computer programming language. For example, preferred embodiments may be implemented in a procedural programming language (e.g., "C" or "Go") or an object-oriented language (e.g., "C++", "java", "PHP", "PYTHON" or "C#"). Alternative embodiments of the invention may be implemented as pre-programmed hardware elements, other related components, or as a combination of hardware and software components.

Embodiments can be implemented as a computer program product for use with a computer system. Such implementations may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink-wrapped software), preloaded with a computer system (e.g., on system ROM or fixed disk), or distributed from a server over a network (e.g., the Internet or World Wide Web). Of course, some embodiments of the invention may be implemented as a combination of both software (e.g., a computer program product) and hardware. Still other embodiments of the invention may be implemented as entirely hardware, or entirely software (e.g., a computer program product).

A person understanding this invention may now conceive of alternative structures and embodiments or variations of the above all of which are intended to fall within the scope of the invention as defined in the claims that follow.

TABLE A

| Resonator Structure | Dimensions (mm) |
|---|---|
| Split Ring Resonator (SRR) | a = 6, b = 0.8, l = 0.254 |
| Dipole Ring Resonator (DRR) | c = 4, d = 0.2, e = 0.4, g = 0.254 |
| Coupled Resonators | Λ = 8, s = 2, f = 0.2 |
| Metasurface Array | Layer 1: RO4003C, thickness 0.508,<br>Layer 2: RO4003C, thickness 0.2<br>N × N = 30 × 10 = 300 cells<br>(Line by line control), Total size: 485.40 × 254.40<br>PIN diode voltage range: 0-1.2 V,<br>Varactor diode voltage range: 0-10 V<br>6 Digital to Analog Convertors (DACs)<br>of 10 outputs each (total 1024 states)<br>(3 each for biasing the PIN and Varactor diodes) |

TABLE B

| Type | Specifications |
|---|---|
| PIN Diode | $R_s$ = 700 Ω @ $V_f$ = 0.5 mV,<br>$R_s$ = 1 Ω @ $V_f$ = 0.9 mV |
| Varactor Diode | $C_T$ = 2.22 pF @ $V_r$ = 0 V,<br>$C_T$ = 0.3 pF @ $V_r$ = 20 V |
| Fixed Capacitors | 1 pF |

TABLE C

| Type | Specifications |
|---|---|
| Microcontroller IC | Core size: 32 Bit<br>Speed: 48 MHz<br>Number of I/O: 38 |
| Digital to Analog Convertors (DACs) | 10 channels<br>switching frequency: 100 KHz<br>Output setting: 7 μs<br>(6 DAC of 10 channels each) |
| DC voltage switching regulator | 12 V to 6 V |
| DC voltage switching regulator | 12 V to 10 V |
| DC voltage switching regulator | 8 V to 3.3 V |
| DC voltage switching regulator | 6 V to 5 V and<br>6.4 V to 1.8 V |
| Board To Board Connector | number of positions: 50 |

We claim:

1. A system for reflecting at least one incoming electromagnetic wave, the system comprising:

an array of unit cells for reflecting said at least one incoming electromagnetic wave to thereby redirect said at least one incoming electromagnetic wave;

wherein each unit cell of said array of unit cells redirects said at least one incoming electromagnetic wave such that characteristics of said electromagnetic waves that have been redirected by said array are determined by a configuration of said each unit cell, wherein a configuration of at least one unit cell in said array is fixed, and wherein at least one unit cell in said array has a configuration comprising two resonators coupled to one another.

2. The system according to claim 1, wherein said electromagnetic waves that have been redirected by said array form at least two beams, each of said at least two beams being a result of complex reflectances of at least one subset of said unit cells in said array.

3. The system according to claim 1, wherein a configuration of at least one unit cell differs from a configuration of at least one other unit cell in said array.

4. The system according to claim 1, wherein said two resonators comprise a rectangular ring resonator and a slot resonator.

5. The system according to claim 4, wherein said rectangular ring resonator is on a first plane while said slot resonator is on a second plane, said first plane being parallel to said second plane.

6. The system according to claim 5, wherein said rectangular ring resonator is spaced apart from said slot resonator.

7. The system according to claim 1, wherein said system further comprises:

a controller for controlling parameters of at least one of said unit cells, said parameters of said at least one of said unit cells being determinative of parameters for electromagnetic waves that have been redirected by said at least one unit cells;

and wherein each of said at least one unit cell has independently controllable parameters such that said independently controllable parameters determine a reflection magnitude and a reflection phase of said electromagnetic waves that have been redirected by said at least one unit cell;

wherein said independently controllable parameters for each of said at least one unit cell are controlled by said controller.

8. The system according to claim 7, wherein said independently controllable parameters comprises an independently controllable resistance and an independently controllable capacitance.

9. The system according to claim 8, wherein said at least one unit cell of said array of unit cells comprises at least one pair of coupled resonators, each of said resonators in said at least one pair of coupled resonators having an independently controllable parameter.

10. The system according to claim 9, wherein each pair of coupled resonators comprises a dipole ring resonator and a split ring resonator.

11. The system according to claim 9, wherein said independently controllable parameter is implemented using at least one of: a tunable lumped resistive element and a tunable lumped capacitor.

12. The system according to claim 9, wherein said independently controllable parameter is one of: mechanically controlled by said controller and electronically controlled by said controller.

13. The system according to claim 7, wherein at least one unit cell in said array is physically displaced relative to other unit cells to thereby decouple a reflection phase of said redirected electromagnetic waves from a reflection magnitude of said redirected electromagnetic waves.

14. A unit cell for use in reflecting at least one incoming electromagnetic wave, the unit cell comprising:

a rectangular ring resonator having a fixed length, width, and thickness;

a slot resonator having a fixed slot length and slot width;

wherein parameters of said rectangular ring resonator and parameters of said slot resonator are configured to produce a specific reflecting magnitude and phase for at least one reflected electromagnetic wave;

wherein said rectangular ring resonator is on a first plane and said slot resonator is on a second plane, said first plane being parallel to said second plane;

wherein said first plane is spaced apart from said second plane.

15. A unit cell for use in reflecting at least one incoming electromagnetic wave, the unit cell comprising:

a dipole ring resonator having a tunable lumped resistive element;

a split ring resonator having a tunable lumped capacitor;

wherein a resistance of said resistive element and a capacitance of said capacitor is each tunable independently of one another;

wherein said dipole ring resonator is coupled to said split ring resonator.

16. The unit cell according to claim 15, wherein said resonators are interleaved with one another on a same layer.

17. The unit cell according to claim 15, wherein said resonators are edge or laterally coupled.

18. The unit cell according to claim 15, wherein said resonators are configured in a broadside or vertical configuration.

* * * * *